(12) United States Patent
Kuroki et al.

(10) Patent No.: US 8,378,997 B2
(45) Date of Patent: Feb. 19, 2013

(54) INFORMATION PROCESSING METHOD AND DEVICE FOR PRESENTING HAPTICS RECEIVED FROM A VIRTUAL OBJECT

(75) Inventors: Tsuyoshi Kuroki, Cambridge, MA (US); Christian Sandor, Tokyo (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 11/737,695

(22) Filed: Apr. 19, 2007

(65) Prior Publication Data

US 2007/0247393 A1 Oct. 25, 2007

(30) Foreign Application Priority Data

Apr. 21, 2006 (JP) .................................. 2006-117732

(51) Int. Cl.
*G06F 3/033* (2006.01)
(52) U.S. Cl. ........................................ 345/179; 345/7
(58) Field of Classification Search .... 178/19.01–19.07; 345/7–9, 179–183
See application file for complete search history.

(56) References Cited

U.S. PATENT DOCUMENTS

| | | | |
|---|---|---|---|
| 5,576,727 A * | 11/1996 | Rosenberg et al. | 345/179 |
| 6,873,944 B1 * | 3/2005 | Buttolo et al. | 703/7 |
| 6,987,504 B2 * | 1/2006 | Rosenberg et al. | 345/156 |
| 7,460,105 B2 * | 12/2008 | Rosenberg et al. | 345/156 |
| 2002/0119432 A1 * | 8/2002 | Ranta et al. | 434/263 |
| 2005/0068314 A1 | 3/2005 | Aso et al. | |
| 2005/0231532 A1 * | 10/2005 | Suzuki et al. | 345/633 |

FOREIGN PATENT DOCUMENTS

| | | |
|---|---|---|
| EP | 1117074 A2 | 7/2001 |
| JP | 2000-098869 A | 4/2000 |
| JP | 2000-259074 A | 9/2000 |
| JP | 2001-195601 A | 7/2001 |
| JP | 2002-304246 A | 10/2002 |
| JP | 2005-107970 A | 4/2005 |

OTHER PUBLICATIONS

"Human Interface" May 30, 1998, pp. 238-241, published by Ohmsha, supervising editor Hiroshi Tamura.
Diego C. Ruspini et al, "The Haptic Display of Complex Graphical Environments", SIGGRAPH 97 Proceedings, Aug. 1997, pp. 345-352.

\* cited by examiner

*Primary Examiner* — Michael Pervan
(74) *Attorney, Agent, or Firm* — Canon USA, Inc., IP Division

(57) ABSTRACT

At the time of using a haptic device to present to a user haptics which a first virtual object superimposed on the haptic device receives from a second virtual object superimposed on a real object, the user is enabled to touch within the second virtual object, regardless of the real object. Accordingly, the haptics received from the second virtual object is obtained using a first haptic event model of the first virtual object and a second haptic event model of the second virtual object, and while the first haptic event model corresponds to computer graphics information of the first virtual object, the shape of the first virtual object differs from that of the haptic device, such that instructions can be made regarding the inside of the real object, using the first virtual object.

14 Claims, 13 Drawing Sheets

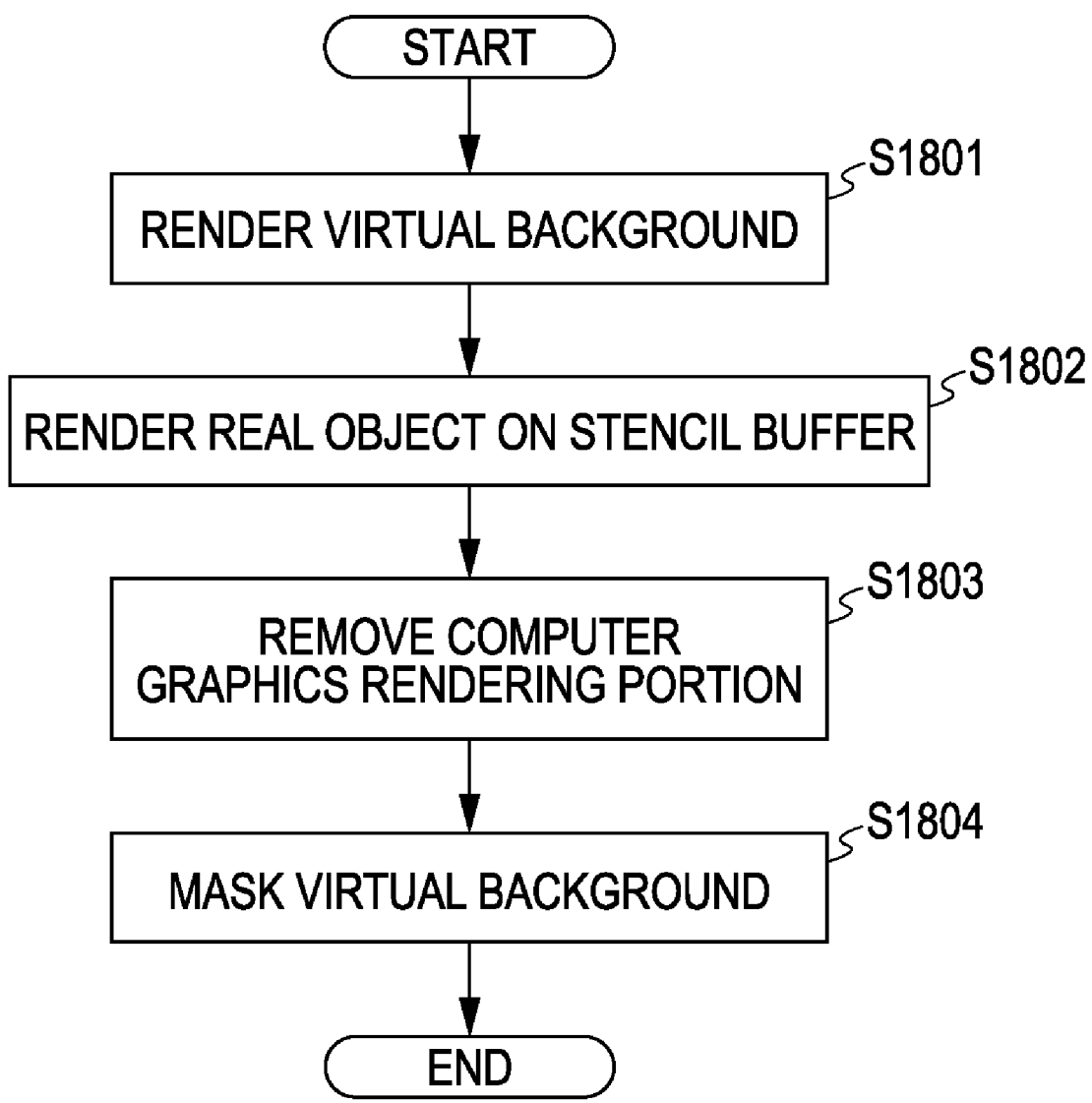

INFORMATION PROCESSING METHOD AND DEVICE FOR PRESENTING HAPTICS RECEIVED FROM A VIRTUAL OBJECT

BACKGROUND OF THE INVENTION

1. Field of the Invention

The present invention relates to an information processing method and device for presenting haptics received from a virtual object, and particularly relates to presenting a user with haptics which a first virtual object superimposed on a haptic device receives from a second virtual object superimposed on a real object, using the haptic device.

2. Description of the Related Art

There are known VR (Virtual Reality) systems using HMDs (Head-Mounted Displays). These are systems for giving a user wearing the HMD the impression that a virtual space actually exists by presenting three-dimensional computer graphics generated by a computer to the user. VR systems using HMDs change the three-dimensional computer graphics presented to the user in accordance with the motion of the head of the user, so the user receives the impression that the three-dimensional computer graphics are actually around himself/herself.

With such VR systems, a device called a haptic device can be used to provide the user with virtual sensations. Using a haptic device enables the user to feel as if he/she were touching objects that do not actually exist, in a virtual manner. Various types of haptic devices, such as those using mechanical arrangements, string tension, and so forth, are disclosed in, for example, "Human Interface" May 30 1998, pp 238-241, published by Ohmsha, supervising editor Hiroshi Tamura.

Also, in recent years, technology called MR (Mixed Reality) has been developed, providing for systems wherein three-dimensional computer graphics can be superimposed upon real space pictures and presenting the superimposed three-dimensional computer graphics to the user, thereby providing the user with a real world which could not be viewed with VR. An example of MR is that disclosed in Japanese Patent Laid-Open No. 2001-195601.

MR systems generally employ HMDs. With MR systems the images of real space and images of virtual space are synthesized, and displayed using an HMD, thereby realizing the sensation of mixed reality. There are currently two types of HMD techniques used with MR systems, one being an optical see-through technique wherein images such as three-dimensional computer graphics are superimposed on a translucent-type HMD, and the other being a video see-through technique wherein the three-dimensional computer graphics are synthesized with images taken with one or two video cameras mounted on the HMD, and then displayed at the HMD.

Applications of MR systems which are being conceived include medical assistance uses for providing a physician with views through the body of a patient, assembly uses in a factory where assembly procedures for a product are displayed by computer graphics over real objects, and so forth.

One type of an MR system is to create a mock-up in a simplified manner from three-dimensional CAD data, and then display three-dimensional computer graphics, created from the same data, thereupon, as disclosed in Japanese Patent Laid-Open No. 2005-107970. With such a system, the user can move the three-dimensional computer graphics with his/her own hands. Description of haptic systems is also made in Diego C. Ruspini et al, The Haptic Display of Complex Graphical Environments, SIGGRAPH 97 Proceedings, August 1997, pp. 345-352.

The method described Japanese Patent Laid-Open No. 2005-107970 enables a user to watch a virtual object which actually does not exist, while holding a mock-up of the same shape in the hands. That is to say, the virtual object can be experienced in a visual and haptic manner. However, this method does not allow the user to experience touching inside the virtual object, or erasing a part thereof. That is to say, the user has not been able to experience touching inside a virtual object within the actually-existing object, or erasing a part of the actually-existing object.

SUMMARY OF THE INVENTION

The present invention provides an information processing method and device wherein, at the time of presenting the user with haptics received from a second virtual object superimposed on a real object using a haptics device upon which a first virtual object has been superimposed, the interior of the second virtual object can be touched, regardless of the real object.

To this end, according to a first aspect of the present invention, an information processing method for using a haptic device upon which a first virtual object has been superimposed, to present to a user haptics from a second virtual object superimposed on a real object, comprises: a first acquisition step of acquiring position and orientation of a viewpoint of the user; a second acquisition step of acquiring position and orientation of the haptic device; a first virtual image generating step of generating a first virtual image of the first virtual object, based on the position and orientation of the haptic device and computer graphics information of the first virtual object; a second virtual image generating step of generating a second virtual image of the second virtual object, based on the position and orientation of the viewpoint of the user, the position and orientation of the user viewpoint and computer graphics information of the second virtual object; and a presentation step of combining the first virtual image and the second virtual image with a real space image, and presenting the combined image to the user; wherein haptics received from the second virtual object are obtained using a first haptics event model of the first virtual object and a second haptics event model of the second virtual object; the first haptics event model corresponding to the computer graphics information of the first virtual model; and the shape of the first virtual object differs from the shape of the haptics device, so that instructions can be made regarding the interior of the real object using the first virtual object.

According to a second aspect of the present invention, an information processing device for using a haptic device upon which a first virtual object has been superimposed, to present to a user haptics from a second virtual object superimposed on a real object, comprises: a first acquisition unit configured to acquire position and orientation of a viewpoint of the user; a second acquisition unit configured to acquire position and orientation of the haptic device; a first virtual image generating unit configured to generate a first virtual image of the first virtual object, based on the position and orientation of the viewpoint of the user, the position and orientation of the haptic device and computer graphics information of the first virtual object; a second virtual image generating unit configured to generate a second virtual image of the second virtual object, based on the position and orientation of the user viewpoint and computer graphics information of the second virtual object; and a presentation unit configured to combine the first virtual image and the second virtual image with a real space image, and to present the combined image to the user; wherein haptics received from the second virtual object are obtained using a first haptics event model of the first virtual object and a second haptics event model of the second virtual object; the first haptics event model corresponds to the computer graphics information of the first virtual model; and the shape of the first virtual object differs from the shape of the haptics device, so that instructions can be made regarding the interior of the real object using the first virtual object.

Further features of the present invention will become apparent from the following description of exemplary embodiments with reference to the attached drawings.

BRIEF DESCRIPTION OF THE DRAWINGS

FIG. 18 is a flowchart for describing the processing procedures in the fifth embodiment.

DESCRIPTION OF THE EMBODIMENTS

Embodiments of the present invention will now be described with reference to the attached drawings.
First Embodiment With a system according to the present embodiment, three-dimensional computer graphics of an automobile, which is a virtual object, is synthesized in a manner superimposed on a real object, which is displayed on an HMD (Head-Mounted Display) worn by a user. Haptics obtained from the same shape as that of the three-dimensional computer graphics of the automobile are presented to the user via a haptic device.

Figure 4:
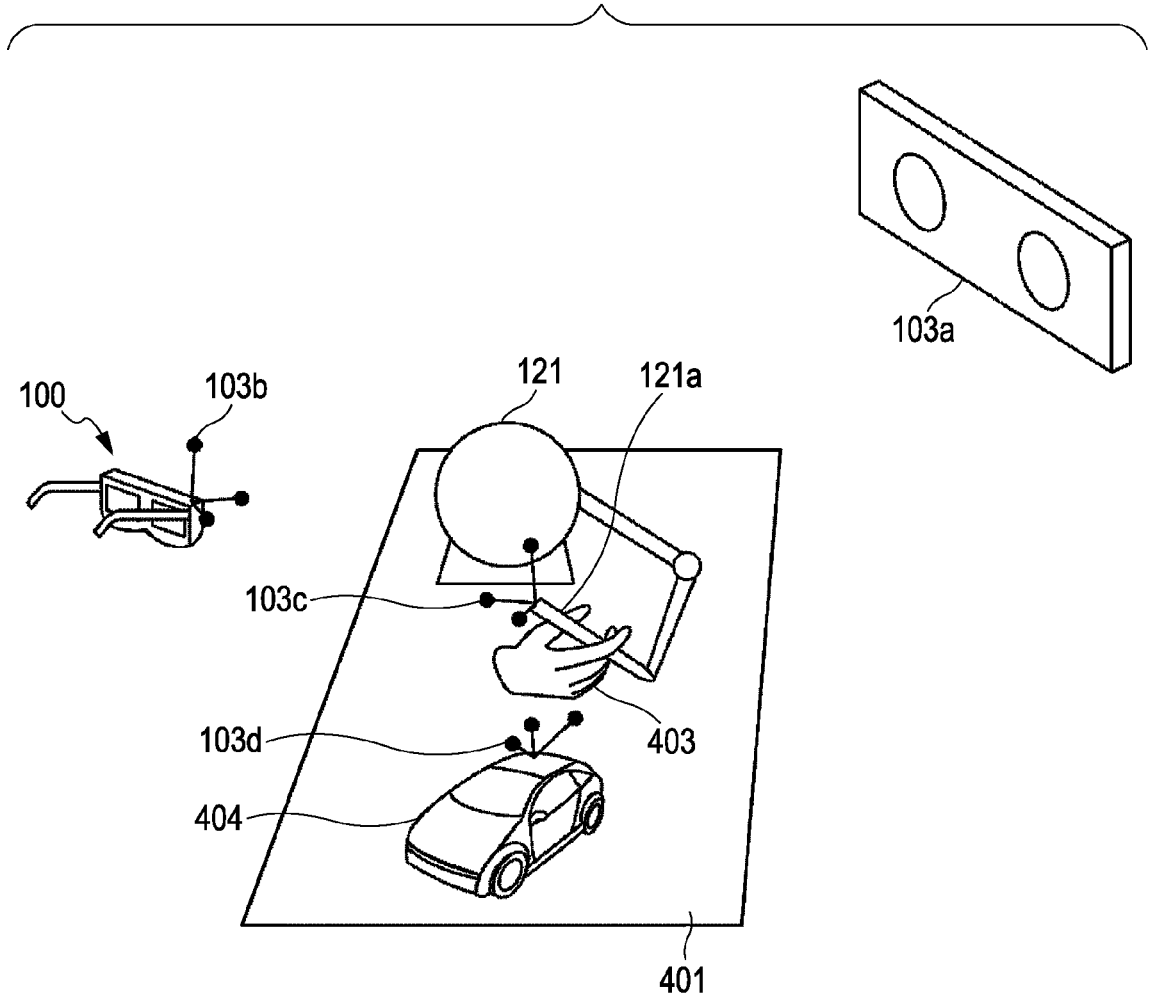
FIG. 4 is a diagram illustrating a concept of the first embodiment.

FIG. 4 is a diagram schematically illustrating the present embodiment, with the wiring and so forth connecting the parts omitted.

Reference numeral 100 denotes an HMD, which is worn by the user when in use. The HMD 100 has built in an imaging unit and display unit, with an image obtained by superimposing three-dimensional computer graphics on an image taken with the imaging unit being displayed thereat. The imaging unit built into the HMD 100 has the necessary internal parameters thereof measured beforehand.

Reference numeral 401 denotes a table. The table is installed in a room, and it is upon this table that the user can experience MR (Mixed Reality).

Reference numeral 121 denotes the haptic device main unit, and 121a a grasping portion of the haptic device. The user can freely move the position and orientation of the grasping portion 121a of the haptic device within a predetermined range. The grasping portion 121a and the haptic device main unit 121 are mechanically connected, with the haptic device main unit 121 driving the grasping portion 121a. Accordingly, the user holding the grasping portion 121a of the haptic device can experience three degrees of freedom; in the vertical direction, horizontal direction, and depth direction. The haptic device main unit 121 is fixed on the table 401.

Reference numeral 403 denotes the hand of the user. Only the hand of the user is illustrated in the drawing, to facilitate description.

Reference numeral 404 denotes a real object, which is a mock-up of an automobile. This mock-up of an automobile has the same shape as the outside of the virtual object of the automobile displayed with the present embodiment. This mock-up is created with a rapid prototype device using stereolithography or the like.

Note that while the present embodiment uses a mock-up with the same shape as the virtual object, this is not imperative to the basic configuration of the present embodiment, and that the shapes of the real object and virtual object may differ.

Also, the material of the mock-up is not restricted in particular. For example, the mock-up may be configured of a model, cardboard, electronic equipment, or various types of tools, instruments, or the like. Moreover, the mock-up may be configured such that the physical attributes thereof can be changed, such as making the inside hollow such that weights of various heaviness can be placed inside, or such as enabling the size or shape to be changed.

Reference numeral 103 denotes a configuration for measuring the position and orientation, and is made up of a camera unit 103a, and marker portions 103b, 103c, and 103d. The marker portion 103b is attached to the HMD 100, the marker portion 103c is attached to the grasping portion 121a of the haptic device, and the marker portion 103d is attached to the real object 404. The marker portion 103b, marker portion 103c, and marker portion 103d each have different shapes. These are taken by two cameras provided to the camera unit 103a of the position-and-orientation sensor regarding which internal parameters have been obtained beforehand, with the relative position and orientation of the marker portion 103b, marker portion 103c, and marker portion 103d as to the camera unit 103a being obtained from the images taken by each of the two cameras, using techniques such as triangulation. The camera unit 103a of the position-and-orientation sensor is fixed within the room.

Figure 3:
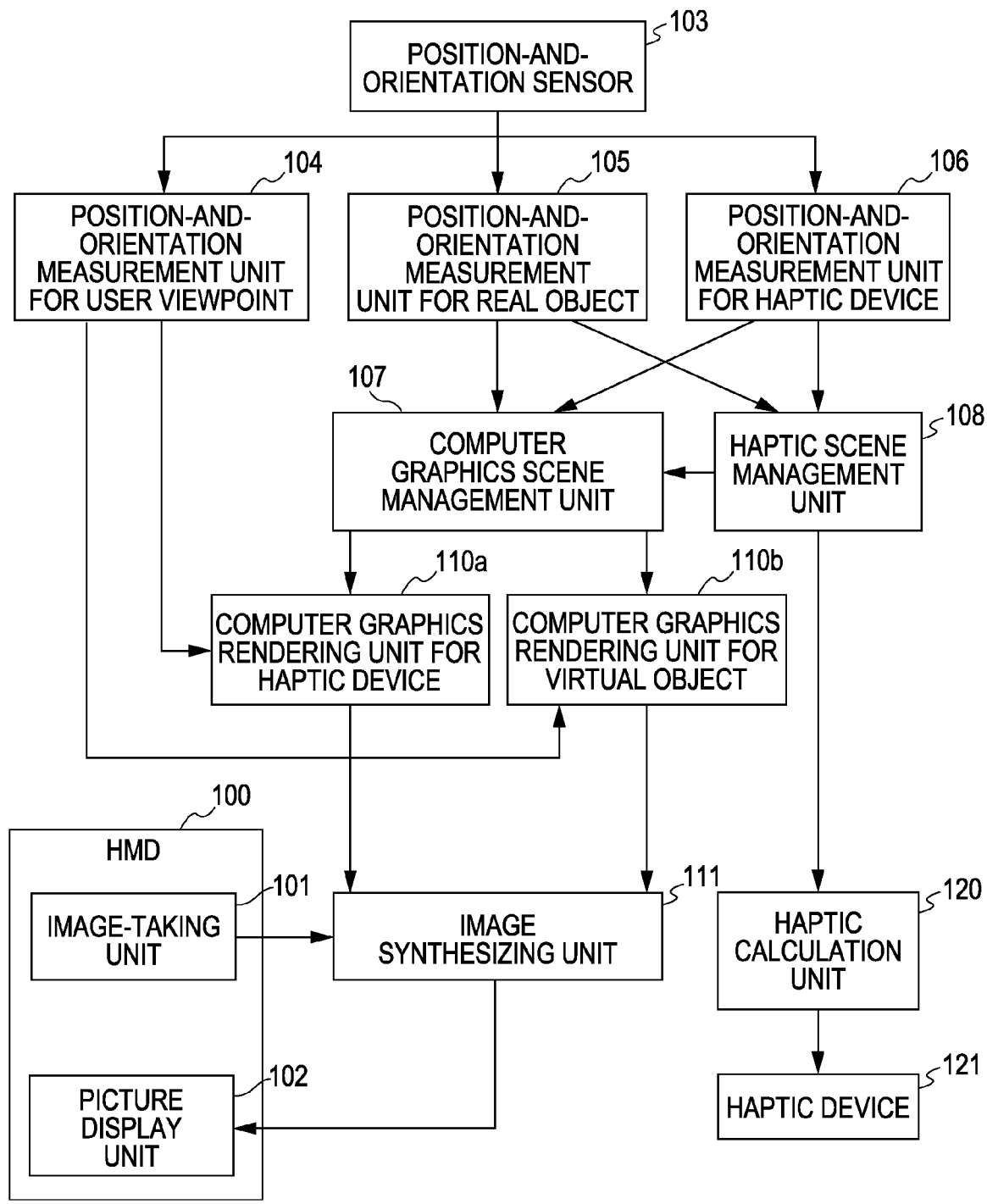
FIG. 3 is a functional block diagram for describing the configuration of the first embodiment.

FIG. 3 is a functional block diagram illustrating the configuration of the present embodiment. The configuration of the present embodiment will now be described with reference to FIG. 3.

Reference numeral 100 denotes a video see-through type HMD which the user wears, as also shown in FIG. 4, and has an image taking unit 101 and picture display unit 102. Note that while the present embodiment is configured such that the image taking unit 101 and picture display unit 102 are built into the HMD 100, this is not indispensable to the basic configuration of the present embodiment, and arrangements may be made wherein the image taking unit 101 and picture display unit 102 are configured separately.

Reference numeral 101 denotes the image-taking unit, configured of image taking devices such as two CCD cameras, CMOS cameras, or the like. The pictures taken at the image-taking unit 101 are sent to a picture-synthesizing unit 111.

Reference numeral 102 denotes the picture display unit, which is configured of two small-sized liquid crystal display devices or the like. The picture display unit 102 displays the synthesized pictures sent from the picture-synthesizing unit 111.

Reference numeral 103 denotes the position-and-orientation sensor, also shown in FIG. 4, for measuring the position and orientation of an arbitrary object by taking images of markers with built-in image-taking devices. The position-and-orientation sensor 103 outputs the position-and-orientation signals of the object, which has been provided with markers beforehand, to a user-viewpoint position-and-orientation measuring unit 104, real object position-and-orientation measuring unit 105, and haptic device position-and-orientation measuring unit 106.

Note that with the present embodiment, position-and-orientation signals are output from one position-and-orientation sensor 103 to each of the position-and-orientation measuring units 104 through 106. However, this is not an indispensable condition for the basic configuration of the present embodiment, for example, the user-viewpoint position-and-orientation measuring unit 104, real object position-and-orientation measuring unit 105, and haptic device position-and-orientation measuring unit 106 may each be provided with separate position-and-orientation sensors.

Also, while the position-and-orientation sensor 103 is configured of an optical sensor in the present embodiment, the position-and-orientation sensor 103 may be configured as any sort of device as long as it is capable of measuring the position and orientation of a predetermined object. For example, the position-and-orientation sensor 103 may be configured as a magnetic-based position-and-orientation sensor. That is to say, any configuration is permissible, as long as position and orientation can be measured from real space regarding these three measurements to be made.

With the present embodiment, the position-and-orientation sensor 103 outputs position in the form of an x coordinate, y coordinate, and z coordinate, in a xyz coordinates system. Also, the orientation is output in the form of roll angle which is rotation on the z axis, pitch angle which is rotation on the x axis, and yaw angle which is rotation on the y axis, and rotating the object to be measured in the order of yaw rotation, pitch rotation, and roll rotation yields the orientation thereof.

Note that in the following description, information of position and orientation which can be expressed by a four-by-four matrix will be represented by a letter of the alphabet, such as M for example. What this matrix is about will be described with reference to an example of position-and-orientation values obtained by the position-and-orientation sensor 103.

With the values of the x coordinate, y coordinate, and z coordinate obtained from the position-and-orientation sensor as x, y, and z, respectively, the three-dimensional vector t representing the position obtained by the position-and-orientation sensor 103 is written as follows.

$$t = \begin{pmatrix} x \\ y \\ z \end{pmatrix}$$ [Expression 1]

Also, with the roll angle, pitch angle, and yaw angle values obtained by the position-and-orientation sensor as r, p, and y, respectively, the three-by-three rotational transform matrix Rr, Rp, Ry obtained form the roll angle, pitch angle, and yaw angle, is written as follows.

$$Rr = \begin{pmatrix} \cos r & -\sin r & 0 \\ \sin r & \cos r & 0 \\ 0 & 0 & 1 \end{pmatrix},$$ [Expression 2]

$$Rp = \begin{pmatrix} 1 & 0 & 0 \\ 0 & \cos p & -\sin p \\ 0 & \sin p & \cos p \end{pmatrix},$$

$$Ry = \begin{pmatrix} \cos y & 0 & -\sin y \\ 0 & 1 & 0 \\ \sin y & 0 & \cos y \end{pmatrix}$$

Accordingly, the three-by-three rotational transform matrix R representing orientation is written as follows.

$$\begin{aligned} R &= RrRpRy \\ &= \begin{pmatrix} \cos r & -\sin r & 0 \\ \sin r & \cos r & 0 \\ 0 & 0 & 1 \end{pmatrix} \begin{pmatrix} 1 & 0 & 0 \\ 0 & \cos p & -\sin p \\ 0 & \sin p & \cos p \end{pmatrix} \begin{pmatrix} \cos y & 0 & -\sin y \\ 0 & 1 & 0 \\ \sin y & 0 & \cos y \end{pmatrix} \\ &= \begin{pmatrix} \cos r \cos y + \sin r \sin p \sin y & -\sin r \cos p & -\cos r \sin y + \sin r \sin p \cos y \\ \sin r \cos y - \cos r \sin p \sin y & \cos r \cos p & -\sin r \sin y - \cos r \sin p \cos y \\ \cos p \sin y & \sin p & \cos p \cos y \end{pmatrix} \end{aligned}$$ [Expression 3]

Using the t and R obtained above, a four-by-four matrix M representing both the position and orientation obtained from the position-and-orientation sensor can be written as follows.

$$M = \begin{pmatrix} R & t \\ 0 & 1 \end{pmatrix}$$ [Expression 4]

Regardless of the format in which the position and orientation are obtained, the fact that the position and orientation can be represented by such a four-by-four matrix is widely known.

The user-viewpoint position-and-orientation measuring unit 104 receives position-and-orientation signals from the position-and-orientation sensor 103. The user-viewpoint position-and-orientation measuring unit 104 then uses signals representing the position and orientation of the marker portion 103b attached to the HMD worn by the user to generate user-viewpoint position-and-orientation information for the image-taking unit 101.

The generated position-and-orientation information is sent to a haptic-device computer-graphics-rendering unit 110a and a virtual-object computer-graphics-rendering unit 110b for calculating the position and orientation of the computer graphics in the picture displayed at the picture display of the HMD. Note that with the present embodiment, the position-and-orientation information of the user-viewpoint position-and-orientation measuring unit 104 is provided from the position-and-orientation sensor 103 alone, however, an arrangement may be made wherein the position-and-orientation information is corrected using pictures taken by the image-taking unit 101. Also, a configuration may be made wherein the position-and-orientation information for the user-viewpoint position-and-orientation measuring unit 104 is obtained using only pictures taken by the image-taking unit 101.

The real object position-and-orientation measuring unit 105 receives position-and-orientation signals from the position-and-orientation sensor 103. The real object position-and-orientation measuring unit 105 uses signals representing the position and orientation of the marker portion 103d attached to the real object 404 so as to generate position-and-orientation information of the real object 404. The generated position-and-orientation of the real object 404 is sent to a computer graphics scene management unit 107 and haptics scene management unit 108.

The haptic-device position-and-orientation measuring unit 106 receives the position-and-orientation signals from the position-and-orientation sensor 103. The haptic-device position-and-orientation measuring unit 106 uses the signals representing the position and orientation of the marker portion 103c attached to the grasping portion 121a of the haptic device to generate position-and-orientation information of the grasping portion 121a of the haptic device. The position-and-orientation information of the grasping portion 121a of the haptic device that is generated is sent to the computer graphics scene management unit 107 and haptics scene management unit 108.

The computer graphics scene management unit 107 manages information of the three-dimensional computer graphics model of the virtual object, necessary for generating the three-dimensional computer graphics. While the three-dimensional computer graphics model information can be described in various formats, the three-dimensional computer graphics model information in the present embodiment is represented in a VRML (Virtual Reality Modeling Language) file, wherein a three-dimensional computer graphics model is represented by a polygon model. Note that a VRML file also stores position-and-orientation information of the three-dimensional computer graphics model. Also, the VRML files stored in the computer graphics scene management unit 107 are a VRML file of a three-dimensional computer graphics model of the virtual object displayed in a superimposed manner over the grasping portion 121a of the haptic device, and VRML files of a three-dimensional computer graphics model of the virtual object of the automobile displayed in a superimposed manner over the real object 404. The VRML file of a three-dimensional computer graphics model of the virtual object displayed in a superimposed manner over the grasping portion 121a of the haptic device is updated by position-and-orientation information sent from the haptic-device position-and-orientation measuring unit 106. The VRML file of a three-dimensional computer graphics model of the virtual object of the automobile is updated by position-and-orientation information sent from the real object position-and-orientation measuring unit 105. Also, the information of the computer graphics management unit 107 is referred to by the haptic-device computer graphics rendering unit 110a and virtual-object computer graphics rendering unit 110b.

With the present embodiment, the three-dimensional computer graphics model of the automobile is made up of three-dimensional computer graphics models of a great number of parts, including three-dimensional computer graphics models of the exterior and interior. Also, each three-dimensional computer graphics model has a translucent display flag as additional information thereof. A translucent display flag is a flag which indicates whether each three-dimensional computer graphics model is to be displayed translucently. In the event that this flag is set to True, the corresponding three-dimensional computer graphics model must be displayed translucently, and if set to False, not display translucently. In the initial state, all of the three-dimensional computer graphics models are set to False regarding this flag. This flag is set from the haptic scene management unit 108 and so forth.

The haptic scene management unit 108 manages haptic event model information of the virtual objects, necessary for calculating the force generated between virtual objects. While the haptic event model information can be described in various formats, the haptic event model information in the present embodiment is represented in a VRML file, wherein a haptic event model is represented by a polygon model. Note however, that in the haptic event VRML file, attribute information representing visual attributes, such as color, light source, texture, and so forth, is removed, and even in the event that such attribute information is included it is ignored. Also, the haptic scene management unit 108 stores the position-and-orientation information of the haptic event model represented by the VRML file. With the present embodiment, the VRML files stored in the haptic scene management unit 108 are a VRML file of a haptic event model at the grasping portion 121a of the haptic device, and a VRML file of a haptic event model of the virtual object of the automobile displayed in a superimposed manner over the real object 404. The position-and-orientation information of the VRML of the haptic scene management unit 108 is updated by position-and-orientation information sent from the real object position-and-orientation measuring unit 105 or haptic device position-and-orientation measuring unit 106. Also, the information of the haptic scene management unit 108 is referred to by a haptics calculation unit 120.

With the present embodiment, the haptic event model of the automobile is made up of haptic event models of a great number of parts, including haptic event models of the exterior and interior. Also, each haptic event model has a haptic event flag as additional information thereof. A haptic event flag is a flag which indicates whether each haptic event model is to be subjected to haptic events. In the event that this flag is set to True, the corresponding haptic event model must be subjected to haptic events, and if set to False, not subjected to haptic events. In the initial state, all of the haptic event models are set to True regarding this flag.

Figure 9:
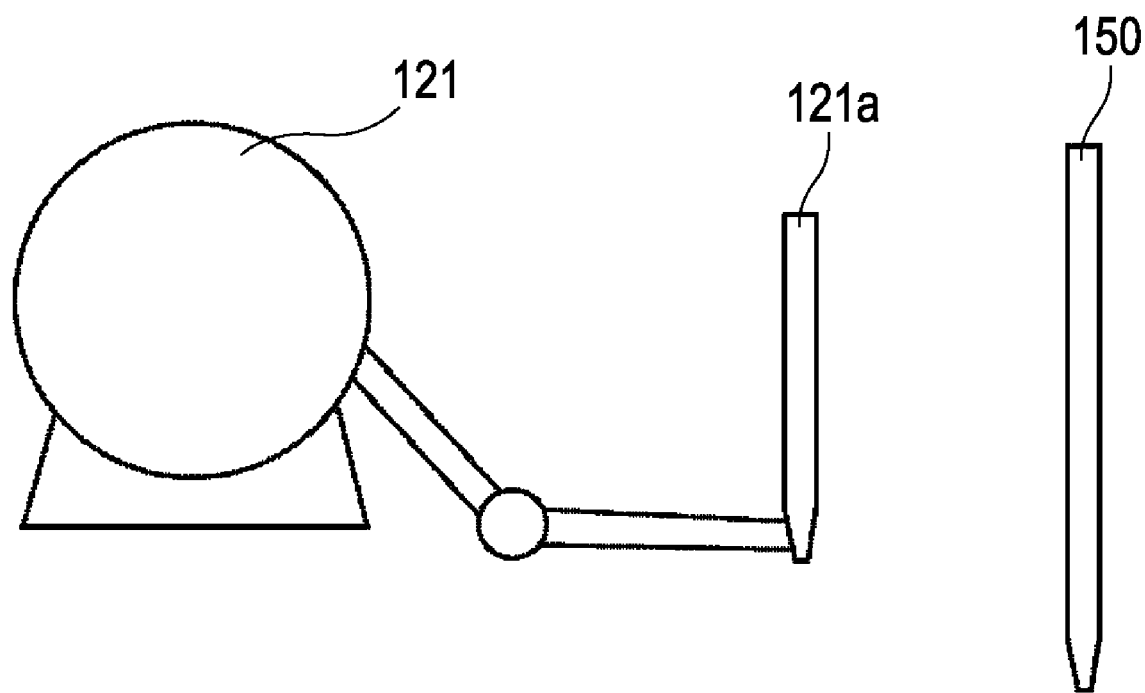
FIG. 9 is a diagram for describing the relation between a haptic device and computer graphics in the first embodiment.

Note that in the present embodiment, the tip of the haptic event computer graphics model 150 representing the grasping portion 121a of the haptic device is set so as to be longer than the actual shape thereof, as shown in FIG. 9.

The haptic-device computer graphics rendering unit 110a receives the position-and-orientation information of the image-taking unit 101 from the user-viewpoint position-and-orientation measuring unit 104, and the three-dimensional computer graphics scene information from the computer graphics scene management unit 107, and generates a computer graphics picture of the haptic device which can be contained within the image-taking range of the image-taking unit 101. The generated computer graphics picture is transmitted to the picture-synthesizing unit 111.

The virtual-object computer graphics rendering unit 110b receives the position-and-orientation information of the image-taking unit 101 from the user-viewpoint position-andorientation measuring unit 104, and the three-dimensional computer graphics scene information from the computer graphics scene management unit 107, and generates a computer graphics picture of the virtual object which can be contained within the image-taking range of the image-taking unit 101. The generated computer graphics picture is transmitted to the picture-synthesizing unit 111.

The picture-synthesizing unit 111 superimposes computer graphics pictures received from the haptic-device computer graphics rendering unit 110*a* and the virtual-object computer graphics rendering unit 110*b* upon the take picture received form the image-taking unit 101, thereby generating a synthesized image. The synthesized image is sent to the picture-display unit 102.

The haptics calculation unit 120 receives haptic scene information from the haptic scene management unit 108 and calculates the haptics to be generated at the grasping portion 121*a* of the haptic device. Note that this haptics information is represented by the direction of the force to be generated, and the strength thereof. The calculated haptics information is sent to the haptic-device main unit 121.

The haptic-device main unit 121 is also illustrated in FIG. 4, for receiving haptics information from the haptics calculation unit 120 and generating force at the grasping portion 121*a* of the haptic device. Note that with the present embodiment, a mechanical-type haptic device is used, with multiple control motors with encoders. However, any device configuration is permissible as long as force can be generated in an arbitrary direction, so haptic devices using string tension for example, may be used. Also, while the haptic device 121 is installed on the table 401 with the present embodiment, there is no restriction on the location of installation, and the haptic device 121 may be worn by the user, for example.

The haptic device main unit 121 internally has its own device coordinates system. Accordingly, the haptics calculation unit 120 converts the force information into the coordinates system of the haptic-device main unit 121, and at the time of the haptic-device main unit 121 generating force at the grasping portion 121*a* thereof, the force information is conveyed in the haptic device coordinates system.

The above has been a description of the configuration of the present embodiment with reference to FIG. 3. It should be noted that the viewpoint position-and-orientation measuring unit 104, real-object position-and-orientation orientation measuring unit 105, haptic-device position-and-orientation measuring unit 106, computer graphics scene management unit 107, haptic scene management unit 108, haptic-device computer graphics rendering unit 110*a,* virtual-object computer graphics rendering unit 110*b,* picture-synthesizing unit 111, and haptics calculation unit 120 may at least in part be realized as an independent device. Alternatively, software for realizing the functions thereof may be installed in one or multiple computers, with the CPU of the computer or computers executing the software, thereby realizing the respective functions. With the present embodiment, each of the above are realized by software, and are installed in the same computer.

Figure 1:
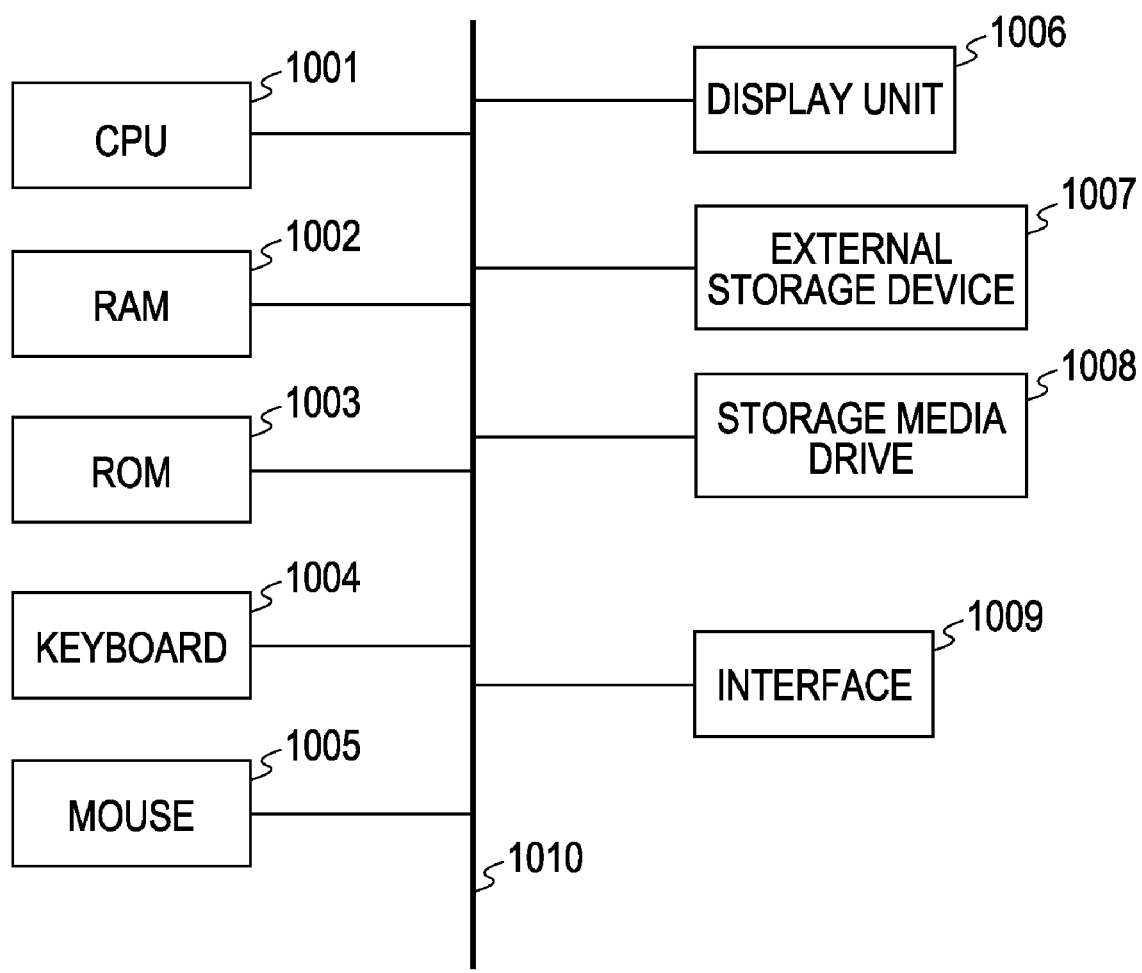
FIG. 1 is a diagram illustrating the basic configuration of a computer for realizing an embodiment of the invention by software.

FIG. 1 is a diagram illustrating the basic configuration of the computer for realizing the functions of the viewpoint position-and-orientation measuring unit 104, real-object position-and-orientation measuring unit 105, haptic-device position-and-orientation measuring unit 106, computer graphics scene management unit 107, haptic scene management unit 108, haptic-device computer graphics rendering unit 110*a,* virtual-object computer graphics rendering unit 110*b,* picture-synthesizing unit 111, and haptics calculation units 120 and 130, by software.

A CPU 1001 controls the overall computer using programs and data stored in RAM 1002 and ROM 1003, and also controls the software for realizing the functions of each of the viewpoint position-and-orientation measuring unit 104, real-object position-and-orientation measuring unit 105, haptic-device position-and-orientation measuring unit 106, computer graphics scene management unit 107, haptic scene management unit 108, haptic-device computer graphics rendering unit 110*a,* virtual-object computer graphics rendering unit 110*b,* picture-synthesizing unit 111, and haptics calculation unit 120.

RAM 1002 has an area for temporarily storing programs and data loaded from an external storage device 1007 or storage medium drive 1008, and a work area for the CPU 1001 to perform various types of processing. ROM 1003 generally stores computer programs, setting data, and so forth.

ROM generally stores computer programs, settings data, and so forth. The operator can use a keyboard 1004 and mouse 1005, which are input devices, to input various types of instructions to the CPU 1001.

A display unit 1006 is configured of a CRT (Cathode Ray tube) or LCD (Liquid Crystal Display) or the like, and can display pictures being displayed on the picture-display unit 102, for example.

The external storage device 1007 is a device serving as a large-capacity information storage device, such as a hard disk drive or the like, and storing the operating system for the computer, the programs executed by the CPU 1001, and so forth. Also, with the description of the present embodiment, information which is described as being known is saved in here, and is loaded to the RAM 1002 as necessary.

The storage medium drive 1008 reads out programs and data stored in a recording medium such as a CD-ROM or DVD-ROM or the like, following instruction from the CPU 1001, and outputs to the RAM 1002 or external storage device 1007.

An interface 1009 is configured of an analog video port or a digital input/output port such as an IEEE 1349 for connecting the image-taking unit 101, a serial port such as RS232C or USB or the like for connecting the position-and-orientation sensor 103 and haptic device main unit 121, and so forth. The data input from each of these is acquired by the RAM 1002 via the interface 1009. A part of the functions of the picture-synthesizing unit 111 and user-viewpoint position-and-orientation measuring unit 104, real-object position-and-orientation measuring unit 105, haptic-device position-and-orientation measuring unit 106, and haptics calculation unit 120, is realized by the interface 1009.

The above-described components are connected by a bus 1010, so as to exchange data one with another.

Figure 2:
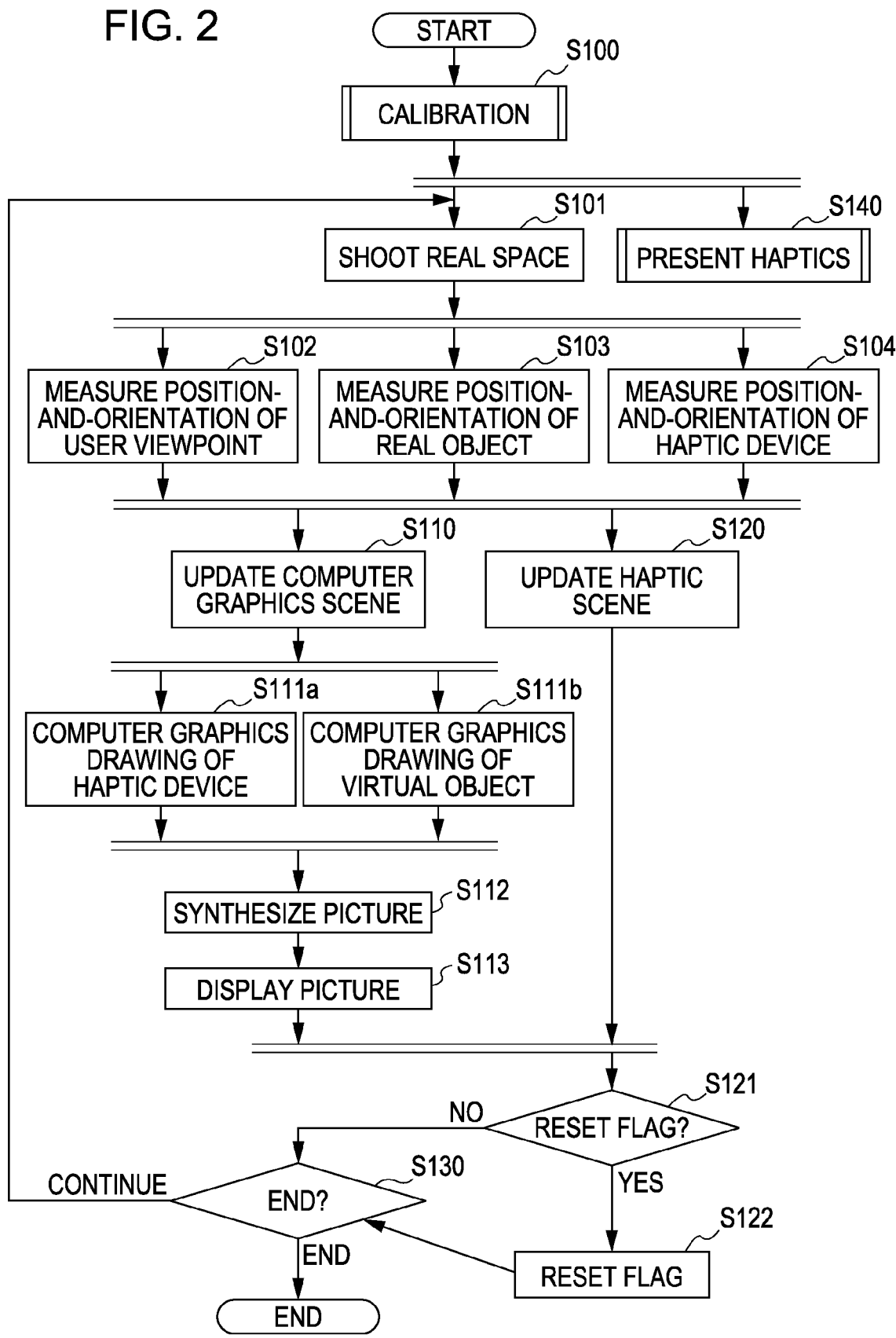
FIG. 2 is a flowchart for describing processing procedures in a first embodiment of the invention.

FIG. 2 is a flowchart illustrating the processing procedures according to the present embodiment. The program for this flowchart is stored in the external storage device 1007, with the CPU 1001 reading out and executing the program upon the user instructing starting of the system using the keyboard 1004 and mouse 1005. The procedures of the present embodiment will now be described with reference to the drawings.

Step S100 is a calibration step. In step S100, the user-viewpoint position-and-orientation measuring unit 104, real-object position-and-orientation measuring unit 105, and haptic-device position-and-orientation measuring unit 106 are initialized so as to be able to calculate position-and-orientation information from the position-and-orientation signals output from the position-and-orientation sensor 103. Also, initialization settings are made for the haptics calculation unit 120, for calculation of force to generate at the haptic-device main unit 121.

Figure 10:
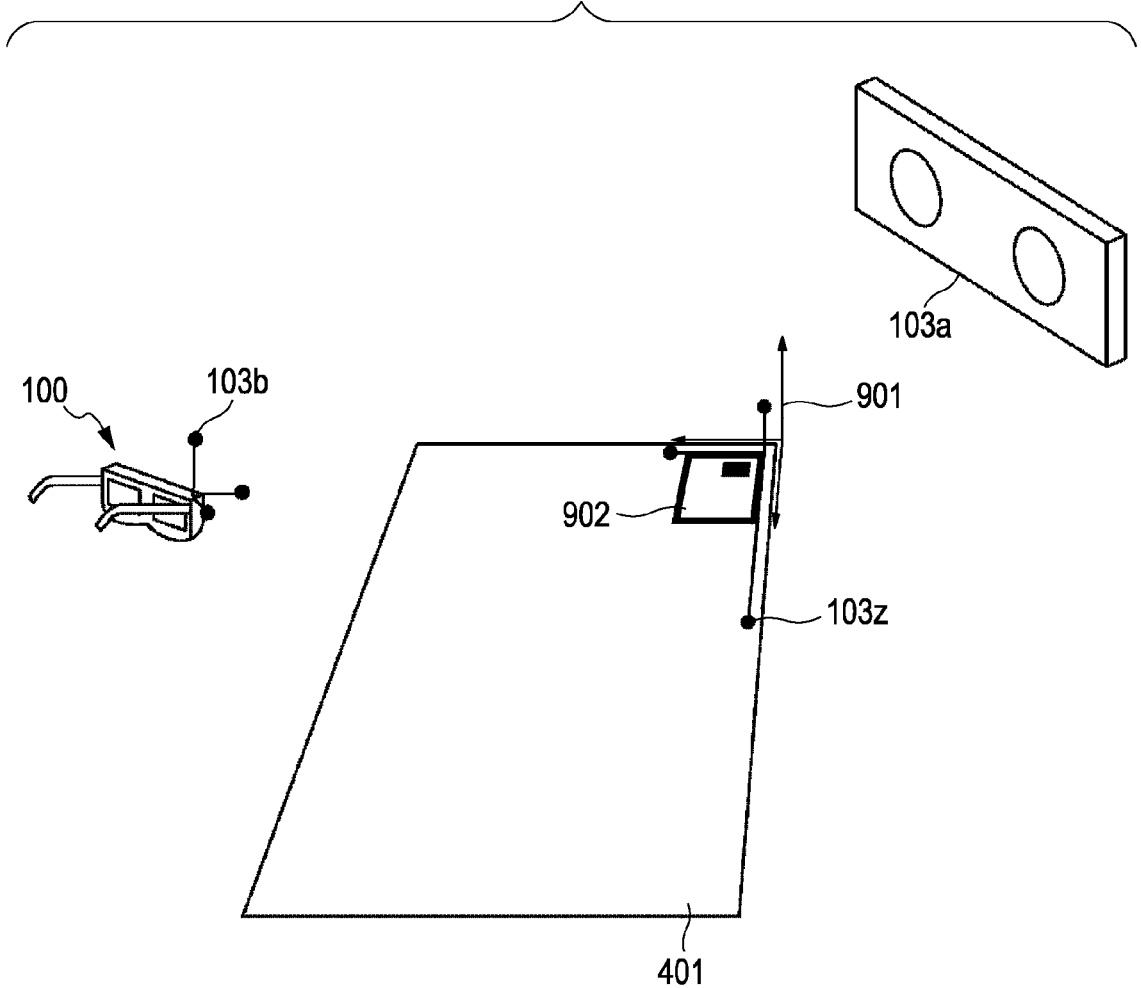
FIG. 10 is a diagram for describing the processing in S1201 and S1202 in the first embodiment.
Figure 12:
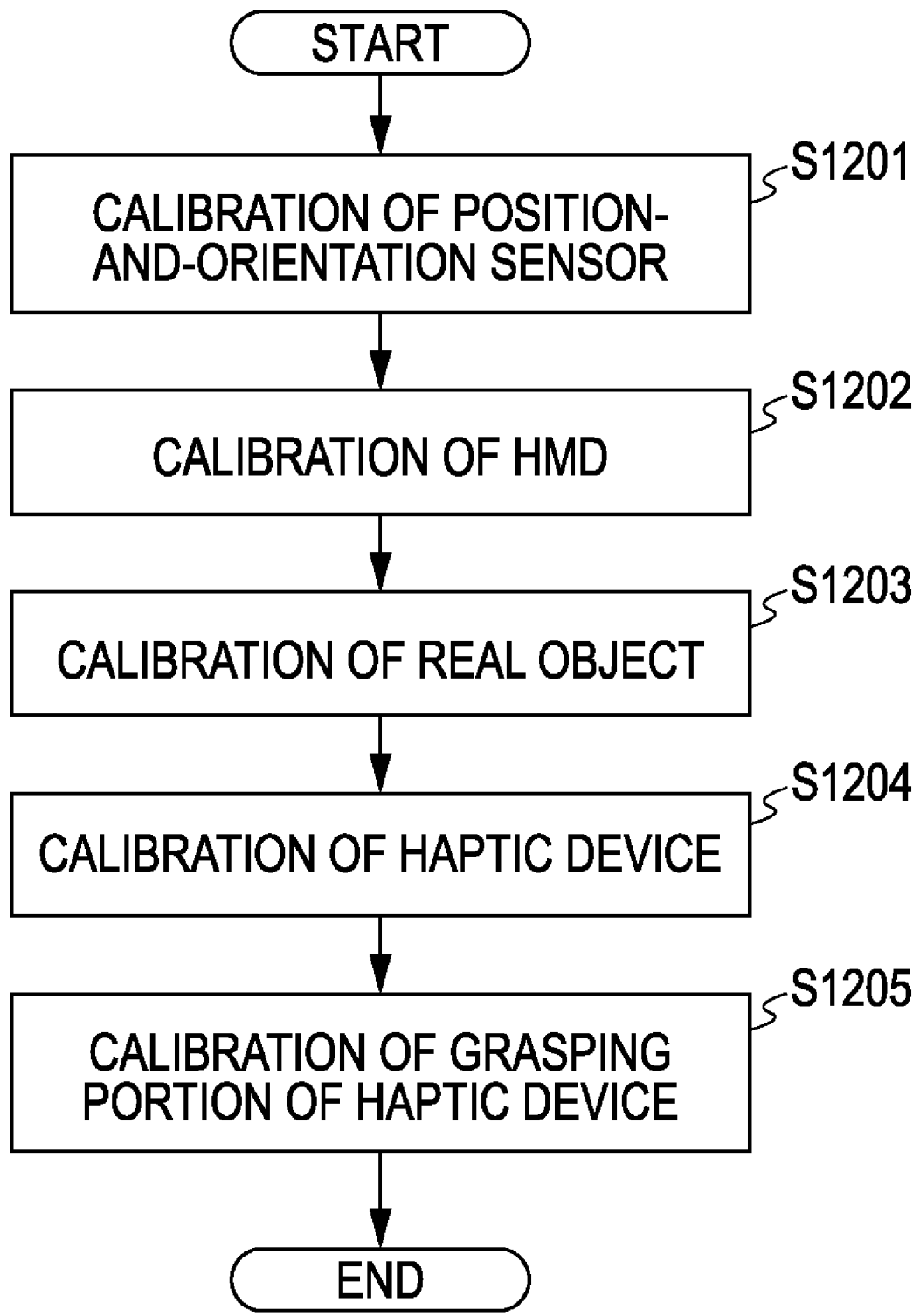
FIG. 12 is a flowchart for describing the processing in S100 in the first embodiment.

Now, the processing procedures in step S100 will be described with reference to FIG. 12. Upon step S100 starting, first, step S1201 is executed. Step S1201 is a position-and-orientation sensor calibration step. FIG. 10 is a diagram for describing the processing performed in steps S1201 and S1202. Reference numeral 901 denotes a world coordinate system in the present embodiment. The world coordinate system 901 is set along the edge of the table 401. To set the world coordinate system 901, in step S1201 the user positions a calibration instrument 103z at the edge of the table 401. The calibration instrument 103z is an instrument to which three markers have been attached, for setting the world coordinate system. The positional relation of the three markers attached to the calibration instrument 103z is known. The camera unit 103a of the position-and-orientation sensor 103 has two cameras built in, which have the internal parameters measured beforehand. Accordingly, the world coordinate system 901 can be set by pressing an unshown calibration button on the position-and-orientation sensor 103. Hereafter, the position-and-orientation signals output from the position-and-orientation sensor 103 are all measured with the world coordinate system 901 as a reference. Upon step S1201 ending, the flow proceeds to step S1202.

Step S1202 is for calibration of the HMD. In this step, the user places a calibration marker 902 at the edge of the table 401, i.e., along the world coordinate system 901. The calibration marker 902 is a rectangular piece of paper of a predetermined size, upon which a predetermined pattern has been printed. The image-taking unit 101 built into the HMD 100 has the internal parameters measured beforehand, so if the image taking unit 101 can take the entirety of the calibration marker 902, the position and orientation of the image-taking unit 101 in the world coordinate system 901 can be obtained. Note that the marker portion 103b is attached to the HMD 100, and that the position and orientation of the marker portion 103b is always being measured by the position-and-orientation sensor. Upon the user instructing execution of step S1202 using the keyboard 1004 and mouse 1005, the following expression holds $$Ho = Hs^{-1} \cdot Hc$$

wherein Hc represents the position and orientation of the image-taking unit 101 obtained from the picture taken by the image-taking unit 101, Hs represents the position and orientation of the marker portion 103b obtained by the position-and-orientation sensor 103, and Ho represents the relative position and orientation of the image-taking unit 101 as viewed from the marker portion 103b.

The Ho obtained here is notified to the user-viewpoint position-and-orientation measuring unit 104. Upon step S1202 ending, the flow proceeds to step S1203.

Figure 11:
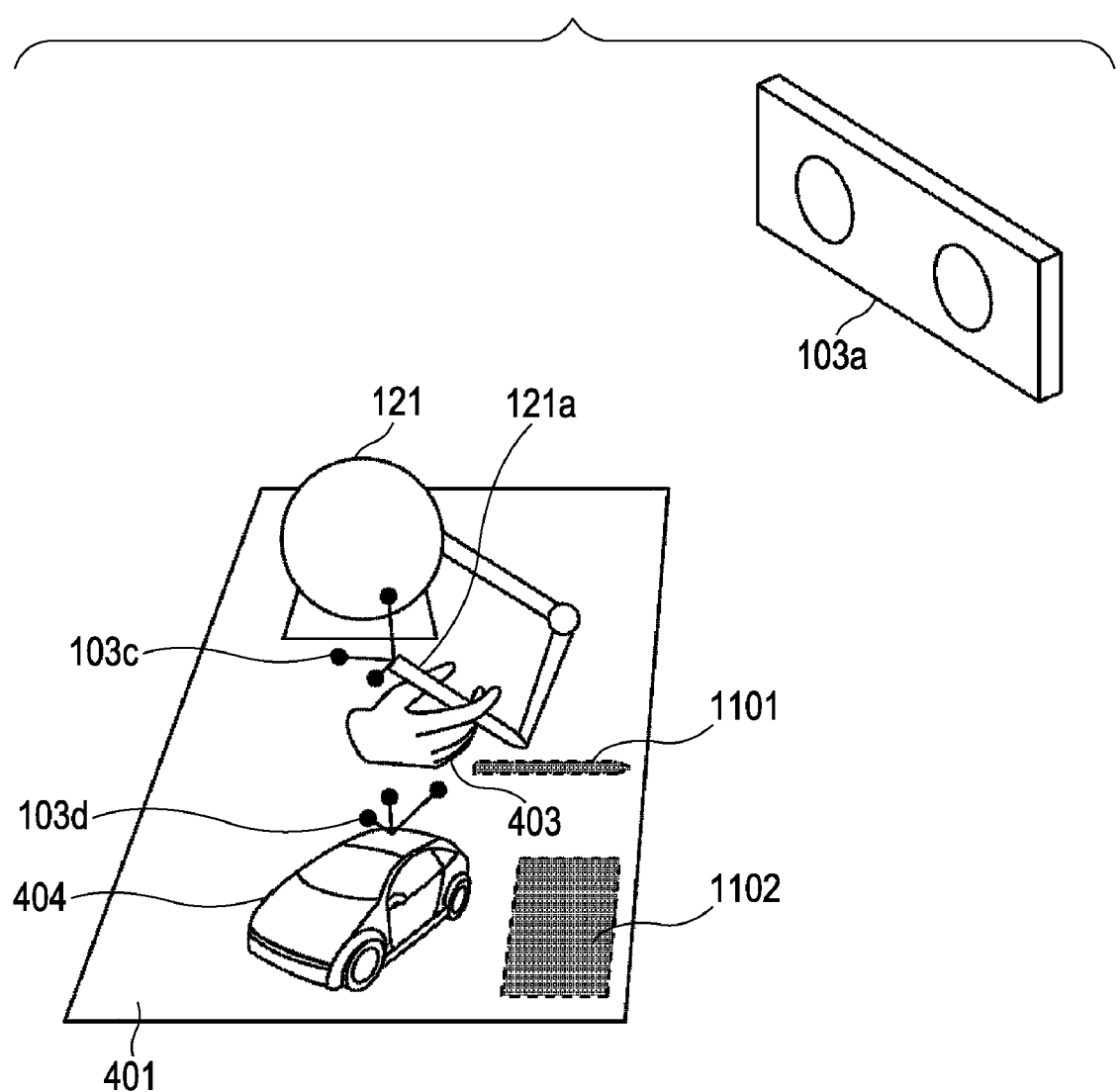
FIG. 11 is a diagram for describing the processing in S1203 and S1205 in the first embodiment.

Step S1203 is for calibration of the real object. FIG. 11 is a diagram for describing the processing in steps S1203 and S1205. Reference numeral 1102 in FIG. 11 denotes a calibration position of the real object 404 set on the table 401 beforehand by as sticker. The calibration position 1102 of the real object is an orthogonal projection of the real object 404. At the time of performing step S1204, the user places the real object 404 on the calibration position 1102 of the real object so as to match, and in a predetermined direction. The marker portion 103d is attached to the real object 404, and the position and orientation of the marker portion 103d is always measured by the position-and-orientation sensor 103. Upon the user instructing execution of step S1203 using the keyboard 1004 and mouse 1005, the following expression holds $$Bo = Bs^{-1} \cdot Bd$$

wherein Bd represents the position and orientation of the calibration position 1102 of the real object in the world coordinate system 901 that has been predetermined, Bs represents the position and orientation of the marker portion 103d obtained by the position-and-orientation sensor 103, and Bo represents the relative position and orientation of the real object 404 as viewed from the marker portion 103d.

The Bo obtained here is notified to the real-object position-and-orientation measuring unit 105. Upon step S1203 ending, the flow proceeds to step S1204.

Step S1204 is for calibration of the haptic device. At the time of step S1204, the user places the haptic-device main unit 121 at a predetermined position on the table 401. Dw, which represents the position and orientation of the haptic-device coordinate system as viewed from the world coordinate system 901, is obtained manually by measurements and calculations, and is input to the haptic calculation unit 120 via the keyboard 1004 and mouse 1005.

Step S1205 is for calibration of the haptic-device grasping portion 121a. In FIG. 11, reference numeral 1101 denotes a calibration position for the grasping portion 121a of the haptic device set on the table 401 beforehand by a sticker. The calibration position 1101 of the haptic device grasping portion 121a is an orthogonal projection of the grasping portion 121a of the haptic device. At the time of performing step S1205, the user places the grasping portion 121a of the haptic device on the calibration position 110 of the haptic-device grasping portion so as to perfectly match, and in a predetermined direction. The marker portion 103c is attached to the grasping portion 121a of the haptic device, and the position and orientation of the marker portion 103c is always measured by the position-and-orientation sensor 103. Upon the user instructing execution of step S1205 using the keyboard 1004 and mouse 1005, the following expression holds $$Po = Ps^{-1} \cdot Pd$$

wherein Pd represents the position and orientation of the calibration position 1101 of the grasping portion 121a of the haptic device in the world coordinate system 901 that has been predetermined, Ps represents the position and orientation of the marker portion 103c obtained by the position-and-orientation sensor 103, and Po represents the relative position and orientation of the tip of the grasping portion 121a of the haptic device as viewed from the marker portion 103c.

Figure 5:
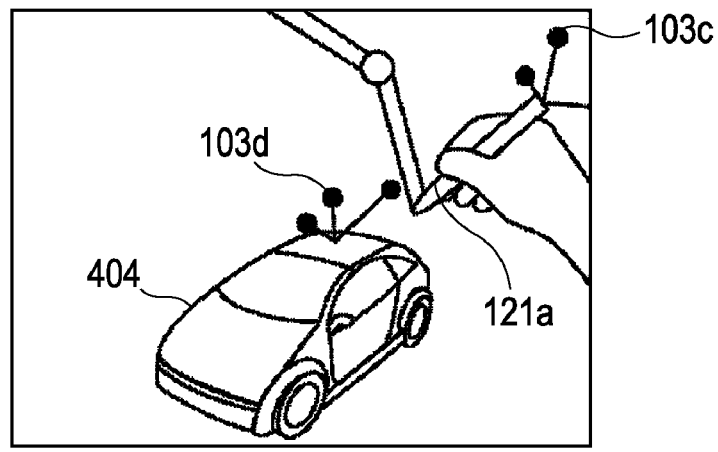
FIG. 5 is a diagram for describing a picture taken in S101 of the first embodiment.

The Po obtained here is notified to the haptic-device position-and-orientation measuring unit 106. Upon step S1205 ending, step S100 ends, the steps S101 and S140 are executed. The processing in step S140 will be described later with reference to a different drawing. Step S101 is a step for taking pictures of real space. The taken picture is sent to the picture-synthesizing unit 111. The picture taken here is such as shown in FIG. 5. FIG. 5 captures the grasping portion 121a of the haptic device, the marker portion 103c and marker portion 103d, and the real object 404. Upon step S101 ending, steps S102, S103, and S104 are executed in parallel.

Step S102 is a user-viewpoint position-and-orientation measurement step. Here, of the position-and-orientation signals sent from the position-and-orientation sensor 103, the user-viewpoint position-and-orientation measurement unit 104 uses signals representing the position and orientation of the marker portion 103b attached to the HMD 100, thereby generating position-and-orientation information for the image-taking unit 101. The expression $$H = Hsn \cdot Ho$$

is obtained, wherein

H represents the position and orientation of the image-taking unit 101 to be obtained, and Hsn represents the position-and-orientation signals of the marker portion 103b obtained from the position-and-orientation sensor 103.

The obtained position-and-orientation information of the image-taking unit 101 is sent to the haptic-device computer graphics rendering unit 110a and virtual-object computer graphics rendering unit 110b.

Step S103 is a real-object position-and-orientation measurement step. Here, of the position-and-orientation signals sent from the position-and-orientation sensor 103, the real-object position-and-orientation measurement unit 105 uses signals representing the position and orientation of the marker portion 103d attached to the real object 404, thereby generating position-and-orientation information for the center of the real object 404. The expression $$B = Bsn \cdot Bo$$

is obtained, wherein

B represents the position and orientation of the real object 404 to be obtained, and Bsn represents the position-and-orientation signals of the marker portion 103d obtained from the position-and-orientation sensor 103.

The obtained position-and-orientation information of the real object 404 is sent to the computer graphics scene management unit 107 and haptic scene management unit 108.

Step S104 is a haptic-device position-and-orientation measurement step. Here, of the position-and-orientation signals sent from the position-and-orientation sensor 103, the haptic-device position-and-orientation measurement unit 106 uses signals representing the position and orientation of the marker portion 103c attached to the grasping portion 121a of the haptic device, thereby generating position-and-orientation information for the tip of the grasping portion 121a of the haptic device. The expression $$P = Psn \cdot Po$$

is obtained, wherein

P represents the position and orientation of the grasping portion 121a of the haptic device to be obtained, and Psn represents the position-and-orientation signals of the marker portion 103c obtained from the position-and-orientation sensor 103.

The obtained position-and-orientation information of the grasping portion 121a of the haptic device is sent to the computer graphics scene management unit 107 and haptic scene management unit 108.

Upon steps S102, S103, and S104 ending, steps S110 and S120 are executed. Step S110 is a computer graphics scene changing step. In step S110, the position-and-orientation information of the three-dimensional computer graphics model in the VRML file stored in the computer graphics scene management unit 107 is updated. That is to say, the position-and-orientation information of the real object 404 is stored as the position-and-orientation information of the VRML file for the three-dimensional computer graphics model representing the automobile, and the position-and-orientation information of the grasping portion 121a of the haptic device is stored as the position-and-orientation information of the VRML file representing the grasping portion 121a of the haptic device. Following step S110, steps S111a and S111b are executed.

Step S111a is a computer graphics rendering step for the haptic device. In step S111a, the haptic-device computer graphics rendering unit 110a uses the position-and-orientation information of the image-taking unit 101 to generate a computer graphics picture representing the grasping unit 121a of the haptic device in the virtual space as viewed from the viewpoint of the image-taking unit 101. The generated computer graphics picture is sent to the picture-synthesizing unit 111. In step S111a, the three-dimensional computer graphics model information stored in the computer graphics scene management unit 107 is referred to.

Step S111b is a virtual-object computer graphics rendering step. In step S111b the virtual-object computer graphics rendering unit 110b uses the position-and-orientation information of the image-taking unit 101 to generate a computer graphics picture representing the virtual object in the virtual space as viewed from the viewpoint of the image-taking unit 101. The generated computer graphics picture is sent to the picture-synthesizing unit 111. In step S111b, the three-dimensional computer graphics model information stored in the computer graphics scene management unit 107 is referred to. Also, in this step, three-dimensional computer graphics models regarding which the translucent display flag is set to True are rendered translucently.

Figure 6:
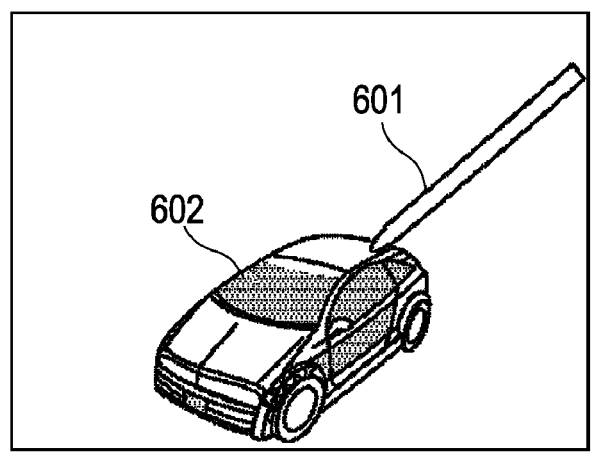
FIG. 6 is a diagram for describing a computer graphics picture generated in S111a and S111b in the first embodiment.

After steps S111a and S111b end, the flow proceeds to step S112. FIG. 6 is a diagram illustrating the computer graphics picture generated at this point. In FIG. 6, reference numeral 601 denotes a three-dimensional computer graphics representing the grasping portion 121a of the haptic device, and reference numeral 602 denotes a three-dimensional computer graphics representing the automobile.

The three-dimensional computer graphics model representing the grasping portion 121a of the haptic device that is stored in the computer graphics scene management unit 107 is rendered such that the tip of the grasping portion 121a of the haptic device is longer than it actually is, as mentioned earlier. Accordingly, the three-dimensional computer graphics 601 representing the grasping portion 121a of the haptic device has the tip thereof rendered longer than that of the grasping portion 121a of the haptic device in FIG. 5 which is an actual picture.

Figure 7:
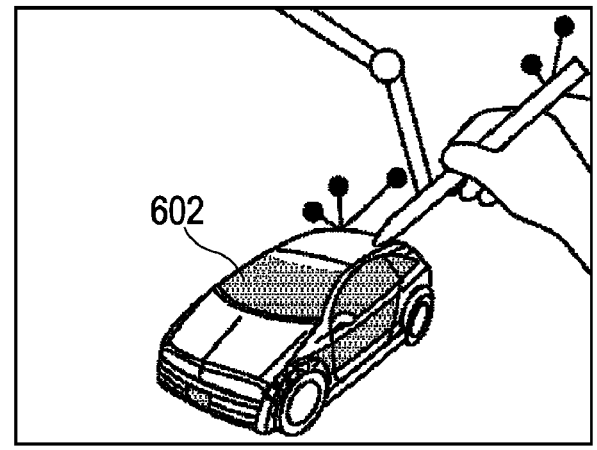
FIG. 7 is a diagram for describing a synthesized picture generated in S112 in the first embodiment.

Step S112 is a picture-synthesizing step. In step S112, first, a picture taken and sent from the image-taking unit 101 is written to the image buffer of the picture-synthesizing unit 111. Next, the computer graphics pictures sent from the haptic-device computer graphics rendering unit 110a and the virtual-object computer graphics rendering unit 110b are superimposed on the image buffer. Consequently, a synthesized image, wherein the virtual object is rendered on the background of the taken image, is generated. FIG. 7 is a diagram for describing the synthesized image obtained at the point. The generated synthesized image is sent to the picture display unit 102. Upon step S112 ending, step S113 is executed.

Step S113 is a picture-displaying step. In step S113, the synthesized picture is displayed on the picture display unit 102.

Step S120 is a haptic scene updating step. In step S120, the haptic scene stored in the haptic scene management unit 108 is updated. That is to say, the position-and-orientation information of the real object 404 is stored as the position-and-orientation information of the haptic event model representing the automobile, and the position-and-orientation information of the grasping portion 121a of the haptic device is stored as the position-and-orientation information of the haptic event model representing the grasping portion 121*a* of the haptic device.

After steps S113 and S120 end, step S121 is executed. Step S121 is a flag reset determining step. In the event that the user has instructed resetting of the translucent display flags and haptic event flags using the keyboard 1004 and mouse 1005 the flow proceeds to step S122. Otherwise, the flow proceeds to step S130.

Step S122 is a flag-resetting step. Here, the translucent display flags for all three-dimensional computer graphics models existing in the virtual space are set to False at the computer graphics scene management unit 107. Also, the haptic event flags for all haptic event models are set to True at the haptic scene management unit 108. Upon S122 ending, the flow proceeds to step S130.

Step S130 is an end determination step. In the event that the user has instructed ending of the system using the keyboard 1004 and mouse 1005, the program ends, and otherwise, the flow proceeds to step S101.

The above has been a description of the processing procedures according to the present embodiment, with reference to FIG. 2.

Now, the processing procedures in step S140 will be described. In step S140, haptic scene information is used to generate haptics at the haptic-device main unit 121. It is generally said that users feel discontinuity in haptics in the event that the haptic device presents haptics at an update rate of under 1000 Hz, so in the loop from steps S201 through S206 (of FIG. 8) in step S140, updating is performed at a rate of 1000 Hz or higher. While various types of techniques can be employed to carry out step S140 as long as the above conditions are satisfied, the Virtual Proxy method and penalty method, which are widely used in systems using haptic devices, are employed with the present embodiment. The virtual proxy method is described in Diego C. Ruspini et al, The Haptic Display of Complex Graphical Environments, SIGGRAPH 97 Proceedings, August 1997, pp. 345-352.

The virtual proxy method is a technique wherein the tip of a haptic device is represented as a sphere having an optional radius, whereby vectors for calculating haptics generated at the tip of the haptic device are obtained by inspecting collision between the sphere and a virtual object regarding which a sense of force is to be generated.

Figure 14:
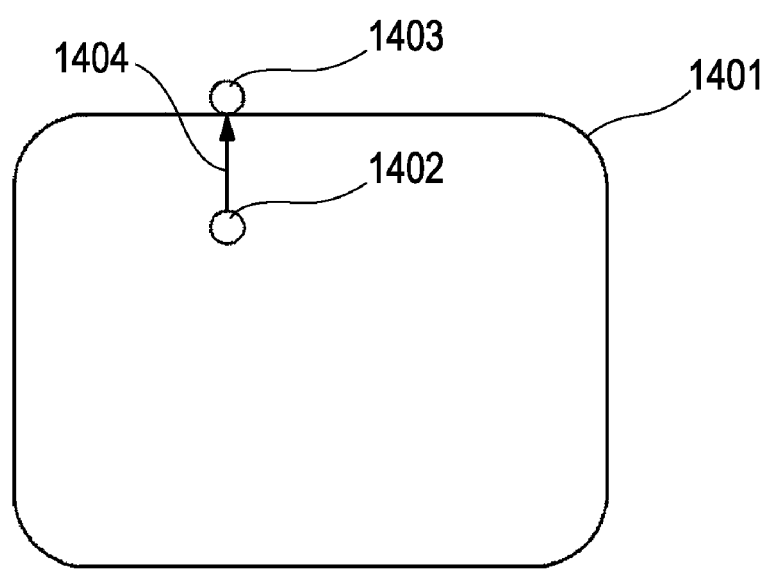
FIG. 14 is a diagram for describing the virtual proxy method.

The virtual proxy method will be described with reference to FIG. 14. Reference numeral 1401 represents the surface of a virtual object, 1402 represents the tip position of the haptic device, indicating a state wherein the tip of the haptic device has become embedded in the virtual object, and 1403 represents the virtual proxy, indicating the position where the haptic device originally should be. Reference numeral 1404 represents a vector for calculating the force to be generated at the haptic device. Thus, with the virtual proxy method, the position where the haptic device originally should be is represented as a virtual proxy which is compared with the actual position, whereby the haptics can be easily calculated. Also, the penalty method is a technique for obtaining the magnitude of reactive force generated as to the virtual object.

Figure 8:
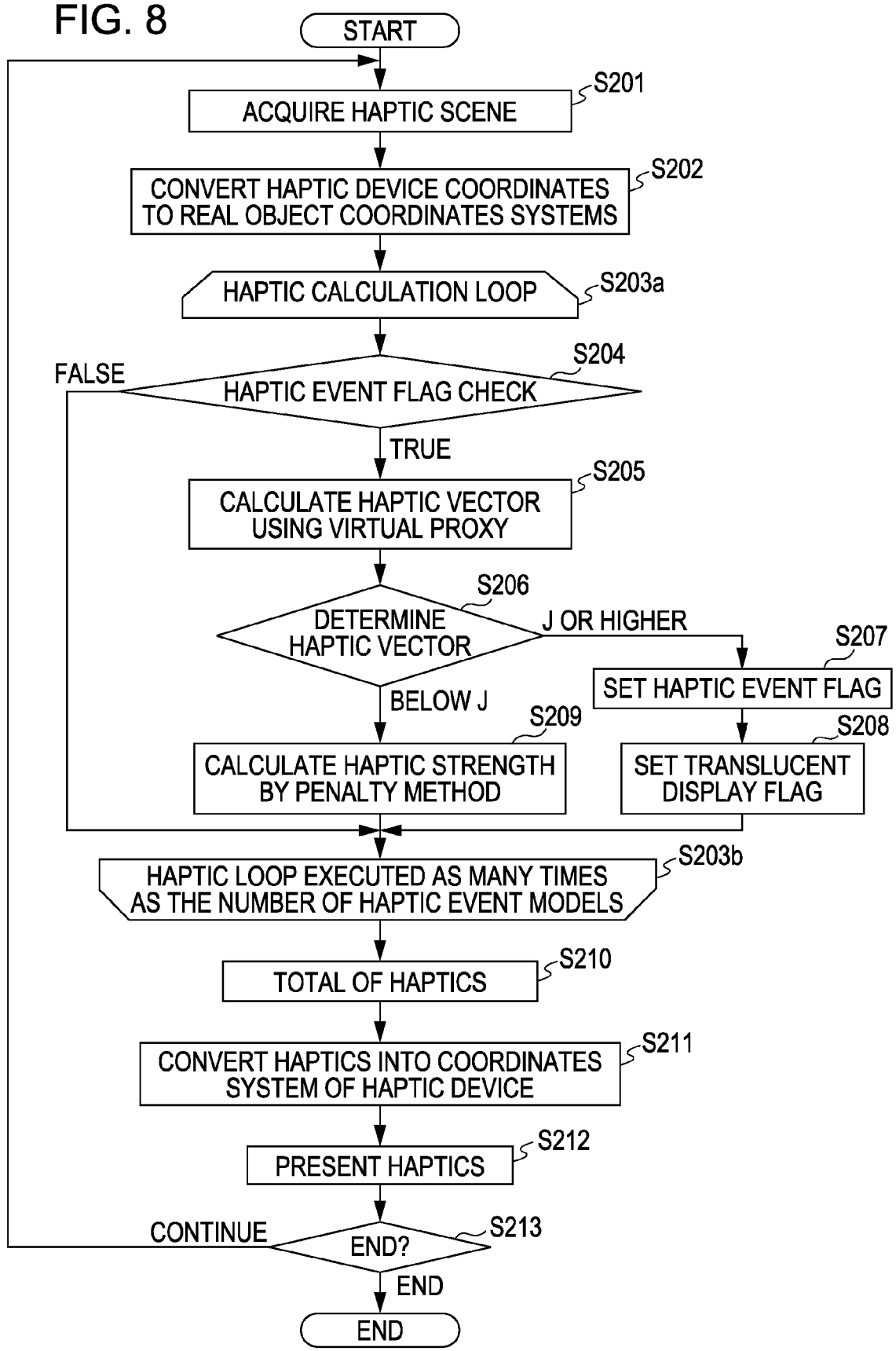
FIG. 8 is a flowchart for describing the processing procedures in S140 of the first embodiment.

FIG. 8 is a flowchart for describing the processing procedures in step S140. Upon step S140 starting, step S201 is first executed.

In step S201, a haptic scene is acquired. Here, the haptic calculation unit 120 acquires the haptic scene from the haptic scene management unit 108. Upon step S201 ending, the flow proceeds to step S202.

In step S202, at the haptic calculation unit 120 the position and orientation of the haptic devices is transformed into position-and-orientation information in the coordinates system of the real object. With the virtual proxy method, the coordinates of the tip of the haptic device must be represented in the coordinate system of the object regarding which sense of force is to be generated, and in this case, the coordinate system of the object regarding which sense of force is to be generated is the coordinate system of the real object 404. With the position-and-orientation of the haptic device in the coordinate system of the real object 404 as Pb, $$Pb = B^{-1} \cdot p$$

holds. Upon step S202 ending, the flow proceeds to step S203*a*.

Step S203*a* is the start of the haptic calculation loop. This means that the haptic calculation is looped by a number of times equal to the number of haptic event models existing in the present embodiment, with ending determination being made in step S203*b* following step S209 ending. In step S203*b*, determination is made regarding whether or not the processing in steps S204, S205, S206, S207, S208, and S209 have been repeated by a number of times equal to the number of haptic event models, and in the event that this is confirmed, the flow proceeds to step S210.

In step S204, the haptic event flag is checked. In the event that the haptic event flag of the haptic event model being subjected to haptic calculation in the current loop is set to True, the flow proceeds to step S205, and if False, to step S203*b*.

In step S205, the Pb obtained by the haptic calculating unit 120 and the haptic event model being subjected to haptic calculation in the current loop are used to execute the virtual proxy, thereby calculating a vector Fw, which indicates the difference between the virtual proxy and the position of the haptic device, for calculating the sense of force to be generated at the tip of the grasping portion 121*a* of the haptic device. Upon step S205 ending, the flow proceeds to step S206.

In step S206, determination is performed regarding the vector Fw for calculating haptics. In the event that the magnitude of this Fw is equal to or above a penetration threshold J, which is a predetermined constant, the flow proceeds to step S207. In the event that the magnitude of Fw is smaller than J, the flow proceeds to step S209. This determination is made regarding whether in the event that the haptic device has entered into the haptic event model by a certain distance or more, the haptic event model is penetrated and no more sense of force is generated from that haptic event model.

Note that here, determination is made according to the Fw whether to go to step S207 or to step S209, but this determination may be made with a different method. For example, determination may be made by input from the keyboard 1004 or mouse 1005, or determination may be made based on the amount of change of Pb obtained in step S202, i.e., the degree of speed.

In step S207, the haptic event flag is set. The haptic event flag of the haptic event model being subjected to haptic calculation in the current loop is set to False, and the flow proceeds to step S208.

In step S208, the translucent display flag is set. The haptic scene management unit 108 sets the translucent display flag of the three-dimensional computer graphics model corresponding to the haptic event model being subjected to haptic calculation in the current loop to True at the computer graphics scene management unit 107. Thus, the three-dimensional computer graphics model corresponding to the haptic event model regarding which no force is to be generated is displayed translucently. After step S208 ends, the flow proceeds to step S203b.

In step S209, the vector obtained in step S205 is used to calculate the intensity of the force generated by the penalty method. With the intensity of the force generated as F, expression $$F=K\cdot|Fw|$$

is used to obtain the force generated. Here, K is a spring coefficient, which is predetermined. This expression implies that a force proportionate to the vector obtained in step S205, i.e., a spring-like force, is applied to the haptic device. Thus, so far, the strength of the vector being generated, i.e., the haptics thereof, is obtained. Upon step S209 ending, the flow proceeds to step S203b.

Step S210 is a haptic totaling step. Here, all haptic information calculated in the loop from step S203a to step S203b is totaled. The information of the total force to be generated is sent to the haptic device main unit 121. Upon step S210 ending, the flow proceeds to step S211.

In step S211, transformation of the haptic force to the haptic-device coordinate system is performed. In this step, information of the force generated in the world coordinate system 901 calculated by the haptic calculating unit 120 is transformed into information of the force in the haptic-device coordinate system. A three degree-of-freedom vector Fd in the haptic-device coordinate system is expressed as $$Fd=Dw^{-1}\cdot Fw$$

using the position-and-orientation Dw of the haptic-device coordinate system as viewed from the world coordinate system 901. The calculated Fd and the F calculated earlier are sent to the haptic-device main unit 121. Upon step S211 ending, the flow proceeds to step S212.

In step S212, haptic presentation is performed. In this step, the haptic-device main unit 121 acquires information of the force to be generated that is obtained from the haptic calculating unit 120, and generates that force at the grasping portion 121a of the haptic device. Upon step S212 ending, the flow proceeds to step S213.

In step S213, the program ends in the event that the user has instructed ending of the system using the keyboard 1004 or mouse 1005, and otherwise the flow proceeds to step S201.

The above has been a description of the processing procedures in step S140 according to the present embodiment, with reference to FIG. 8.

Figure 13:
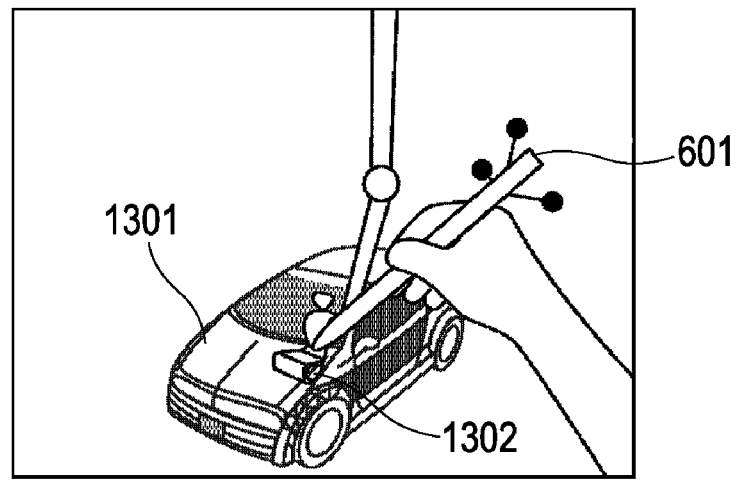
FIG. 13 is a diagram for describing a display example in the first embodiment.

The present embodiment enables user operations such as shown in FIG. 13. FIG. 13 illustrates a state which has been displayed as a result of the user, further pressing the grasping unit 121a of the haptic device into the automobile, from the state shown in FIG. 7. In FIG. 13, reference numeral 1301 denotes the three-dimensional computer graphics model of the exterior of the automobile displayed translucently, and 1302 denotes a virtual seat within the automobile that has become visible due to the three-dimensional computer graphics model 1301 of the exterior of the automobile being displayed translucently.

In FIG. 13, the user is touching the virtual seat 1302 with the three-dimensional computer graphics 601 representing the grasping portion of the haptic device. In the present embodiment, the mock-up of the automobile, which is the real object, exists at the position of the three-dimensional computer graphics 1301 of the exterior of the automobile, which is displayed translucent, so the mock-up of the automobile and the haptic device should collide and the user should not be able to touch inside of the mock-up. However, with the present embodiment, a three-dimensional computer graphics 601 and haptic model representing the grasping portion of the haptic device with a longer tip are superimposed on the grasping portion 121a of the haptic device. Accordingly, the tip of the three-dimensional computer graphics representing the grasping portion of the haptic device can be inserted into the mock-up of the automobile without interference. Haptics are calculated based on the three-dimensional computer graphics representing the grasping portion of the haptic device intruding therein, and the three-dimensional computer graphics of the interior of the mock-up of the automobile. Accordingly, the user can experience presentation of sensations as if he/she were touching within the inside of the real object.

Further, with the present embodiment, the processing in steps S206 through S208 automatically controls display of the three-dimensional computer graphics of the automobile mock-up and the haptic scene relating to the automobile mock-up depending on the position of the grasping portion. Accordingly, the user can automatically operate within the mock-up of the automobile, according to the position of the grasping portion.

Also, if the user removes the grasping portion 121a of the haptic device from the automobile and instructs resetting of the translucent display flags and haptic event flags using the keyboard 1004 or mouse 1005, the user can touch the exterior of the automobile once again. The present embodiment is configured such that resetting of the translucent display flags and haptic event flags is performed manually by the user. In the event that the user inserts the tip of the grasping portion into the automobile, this can be judged as an intent to operate within the automobile. However, even if the user moves the tip of the grasping portion to the outside of the automobile, this does not necessarily mean that the user intends operation of the inside of the automobile, and accordingly cannot be determined to be so. Consequently, with the present embodiment, resetting is performed by manual instructions by the user. Thus, changing of display due to the user moving the grasping portion out from the automobile can be prevented, and accordingly, the display can be prevented from changing unpredictably depending on the position of the grasping portion.

The present embodiment has been described as a video see-through HMD having an image-taking unit 101 and picture-display unit 102 built in, but any configuration may be employed as long as the user can be presented with both the real world and virtual word, and may be an optical see-through type HMD for example. In this case, there is no need for the image-taking unit 101 in FIG. 3, and steps S101 and S112 in FIG. 2 are not executed. Also, this does not need to be configured as a device which is mounted on the user's head, and may be a desktop semi-transmissive display, for example. In this case, there is no need for the image-taking unit 101 or user-viewpoint position-and-orientation measuring unit 104 in FIG. 3, and steps S101, S112, and S102 in FIG. 2 are not executed. Also, with the present embodiment the HMD 100 has been described as a monocular HMD having one each of the image-taking unit 101 and picture-display unit 102, however, the HMD 100 may be a binocular HMD having two each of the image-taking unit 101 and picture-display unit 102, in which case the processing shown in FIG. 2 is performed for either side.

Second Embodiment

With the above-described first embodiment, the virtual object is moved by holding and moving the real object 404. However, this is not an indispensable condition for the basic configuration of the present embodiment, and arrangements may be made wherein the real object 404 is fixed.

In this case, there is no need for the processing of the position-and-orientation sensor 103 in FIG. 2, and the configuration of the real object position-and-orientation measurement unit 105 is also unnecessary.

Third Embodiment

With the above-described first embodiment, the haptic event model and three-dimensional computer graphics model corresponding to the grasping portion of the haptic device are determined beforehand. However, the haptic event model and three-dimensional computer graphics model may be changed by user instructions. For example, the user may use the keyboard 1004 or mouse 1005 to change the size or length of the haptic event model and three-dimensional computer graphics model, or to change the position relation thereof as to the grasping portion of the haptic device.

The way in which the user gives instruction is also not restricted to the keyboard 1004 and mouse 1005, and arrangements may be made wherein an input device such as a dial or the like is provided on the grasping portion of the haptic device so as to be operated.

Enabling the user to control the haptic event model in this way allows the user to easily operate desired portions of the virtual object.

Fourth Embodiment

With the above-described first embodiment, the actual grasping portion of the haptic device is invisible due to the three-dimensional computer graphics model of the grasping portion of the haptic device corresponding thereto, as shown in FIGS. 7 and 13. Accordingly, the user cannot tell the difference between the shape of the actual grasping unit and the shape of the corresponding three-dimensional computer graphics model.

With the present embodiment, this problem can be solved by generating a different virtual image regarding a particular portion of the grasping portion of the haptic device. For example, the portion of difference in shape can be displayed with a different color, or portions with the same shape can be displayed translucently.

Fifth Embodiment

Figure 15:
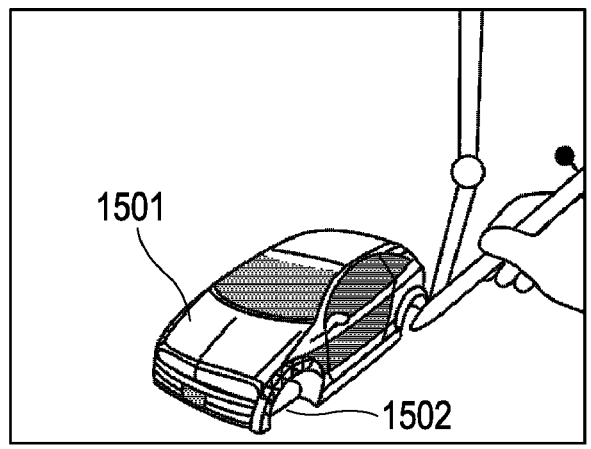
FIG. 15 is a diagram for describing a display example in a fifth embodiment.

With the present embodiment, a method will be described for obtaining an effect as if a part of a portion where the real object exists had been erased, as shown in FIG. 15. In FIG. 15, the tire portions are erased from the three-dimensional computer graphics model 1501 of the exterior of the automobile. Reference numeral 1502 denotes a portion in FIG. 15 where an automobile tire originally was, but with the present embodiment, neither the three-dimensional computer graphics of the automobile nor the actual image of the real object 404 are displayed.

First, a three-dimensional computer graphics to serve as a background is prepared beforehand at the computer graphics scene management unit 107. With the present embodiment, a three-dimensional computer graphics model of the table 401 is prepared. This three-dimensional computer graphics model is made close to, or exactly the same as, that of the real object, regarding both shape and color. While the shape of this three-dimensional computer graphics model needs to be perfectly the same as that of the real object 404, the color may be set any way.

With the present embodiment, three-dimensional computer graphics models with a translucent display flag are not rendered at all at when rendering the computer graphics of the virtual object in step S111b.

Also, with the present embodiment, after the virtual-object computer graphics rendering step S111b, the background computer graphics rendering step, shown in the flowchart in FIG. 18, is executed. Upon the background computer graphics rendering step starting, first, in step S1801, a virtual background is rendered. With the present embodiment, a three-dimensional computer graphics model of the table 401 is rendered. Upon step S1801 ending, step S1802 is executed.

Figure 16:
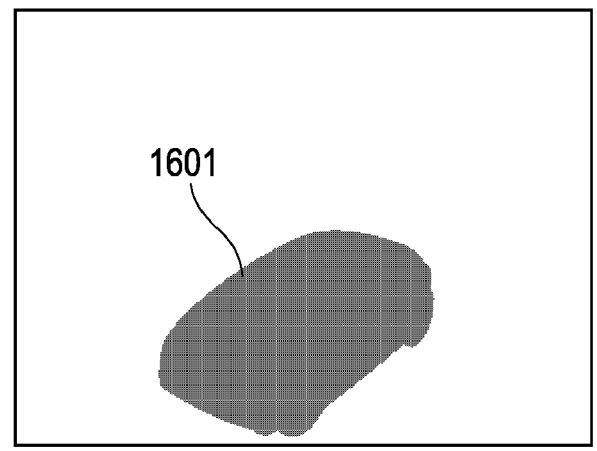
FIG. 16 is a diagram representing a stencil buffer obtained in S1802 in the fifth embodiment.

In step S1802, a three-dimensional computer graphics model having the same shape as the real object is rendered at the stencil buffer of the image rendered in step S1801. Note that a stencil buffer is a special buffer region, provided for each pixel in the image. FIG. 16 is a diagram illustrating the stencil buffer obtained at this point. The reference numeral 1601 in FIG. 16 represents the three-dimensional computer graphics having he same shape as the real object 404. Upon step S1802 ending, the flow proceeds to step S1803.

Figure 17:
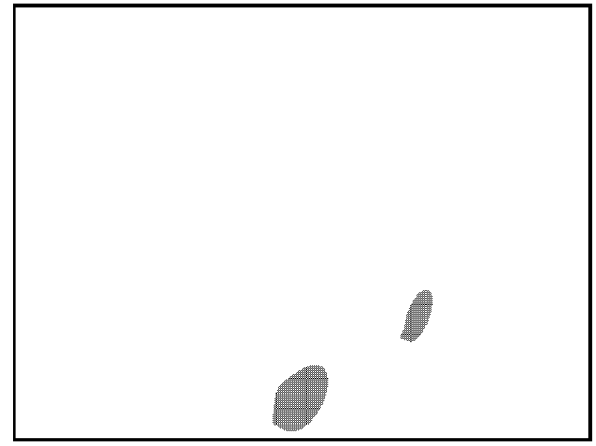
FIG. 17 is a diagram representing a stencil buffer obtained in S1803 in the fifth embodiment.

In step S1803, the region where the computer graphics have already been rendered are erased from the stencil buffer region obtained in step S1802. FIG. 17 is a diagram representing the stencil buffer obtained at this point. Upon step S1803 ending, the flow proceeds to step S1804.

In step S1804, of the virtual background obtained in step S1801, the region other than the stencil buffer obtained in step S1803 is erased.

Upon step S1804 ending, the background computer graphics rendering step ends. The background computer graphics obtained here are synthesized in step S112 with the real picture.

Using the technique described with the present embodiment enables an effect to be obtained as if a part of a portion where the real object exists had been erased, as shown in FIG. 15.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-117732 filed Apr. 21, 2006, which is hereby incorporated by reference herein in its entirety.

What is claimed is:

1. An information processing method to allow a user to utilize a real space haptic device in conjunction with a real space object, wherein the real space haptic device includes a real space tip, the information processing method comprising:

generating real space images, including a real space haptic device image of the real space haptic device and a real space object image of the real space object;

generating virtual space images including a virtual space haptic device image of the real space haptic device image, a virtual space object image of the real space object image, and a virtual space element image, wherein generating virtual space images includes setting a virtual space tip image of the virtual space haptic device image with a virtual space extending shape image such that the real space tip and a real space tip image are equal in length and the virtual space tip image is longer than both the real space tip and the real space tip image by a distance equal to a length of the virtual space extending shape image, and wherein each real space image has an exterior surface that is identical to an exterior surface of a corresponding real space item and, except for the virtual space element image and the virtual space extending shape image, each virtual space image has an exterior surface that is identical to an exterior surface of a corresponding real space image, wherein the virtual space element image is positioned inside the virtual space object image to be surrounded by the exterior surface of the virtual space object image;

creating a haptic scene by superimposing the virtual space haptic device image and the real space haptic device image so that, except for the virtual space extending shape image, they occupy the same space, and superimposing the virtual space object image and the real space object image so that the virtual space object image and the real space object image occupy the same space;

presenting the haptic scene to the user; and controlling to one of (i) allow passing the virtual space extending shape image through the exterior surface of the virtual space object image, while at least not generating haptics, to generate haptics from contact between the virtual space extending shape image and the virtual space element image, while preventing the real space tip image from being passed through the exterior surface of the real space object image and (ii) allow preventing the virtual space extending shape image from extending through the exterior surface of the virtual space object image to generate haptics from contact between the virtual space extending shape image and the exterior surface of the virtual space object image.

2. An information processing method according to claim 1, wherein the controlling is based on user instructions that include at least one of resetting a translucent display flag and a haptic event flag, and wherein at least not generating haptics includes not generating haptics and not removing the exterior surface.

3. An information processing method according to claim 1, wherein, in response to the virtual space extending shape image being inserted a predetermined distance into the virtual space object image, controlling automatically prevents a haptic event between the virtual space extending shape image and the exterior surface of the virtual space object image and automatically causes the exterior surface of the virtual space object image to be displayed translucently.

4. An information processing method according to claim 1, further comprising modifying a shape of the virtual space object image to differ from a shape of the real space object, so that instructions can be made regarding an interior of the real space object image using the virtual space object image.

5. An information processing method according to claim 1, further comprising a background computer graphics rendering step for rendering computer graphics representing a background of real space, and using rendered computer graphics of the background to erase at least part of the real space object image.

6. An information processing method according to claim 1, wherein haptics generated from contact between the virtual space extending shape image and the virtual space object image are generated by virtual proxy and wherein at least not generating haptics includes not generating haptics and not erasing the exterior surface.

7. An information processing method according to claim 1, further comprising receiving a signal indicating that the virtual space extending shape image is moved out from the virtual space object image and preventing a change in haptic event settings and translucent settings based on that signal, wherein at least not generating haptics includes displaying the exterior surface and not generating haptics.

8. An information processing device to allow a user to utilize a real space haptic device in conjunction with a real space object, wherein the real space haptic device includes a real space tip, the information processing device comprising:

a generating unit configured to generate real space images, including a real space haptic device image of the real space haptic device and a real space object image of the real space object, and to generate virtual space images including a virtual space haptic device image of the real space haptic device image, a virtual space object image of the real space object image, and a virtual space element image, wherein generating virtual space images includes setting a virtual space tip image of the virtual space haptic device image with a virtual space extending shape image such that the real space tip and a real space tip image are equal in length and the virtual space tip image is longer than both the real space tip and the real space tip image by a distance equal to a length of the virtual space extending shape image, and wherein each real space image has an exterior surface that is identical to an exterior surface of a corresponding real space item and, except for the virtual space element image and the virtual space extending shape image, each virtual space image has an exterior surface that is identical to an exterior surface of a corresponding real space image, wherein the virtual space element image is positioned inside the virtual space object image to be surrounded by the exterior surface of the virtual space object image;

a creating unit configured to create a haptic scene by superimposing the virtual space haptic device image and the real space haptic device image so that, except for the virtual space extending shape image, they occupy the same space, and superimposing the virtual space object image and the real space object image so that the virtual space object image and the real space object image occupy the same space;

a display unit configured to present the haptic scene to the user; and a central processing unit configured to control to one of (i) allow passing the virtual space extending shape image through the exterior surface of the virtual space object image, while at least not generating haptics, to generate haptics from contact between the virtual space extending shape image and the virtual space element image, while preventing the real space tip image from being passed through the exterior surface of the real space object image and (ii) allow preventing the virtual space extending shape image from extending through the exterior surface of the virtual space object image to generate haptics from contact between the virtual space extending shape image and the exterior surface of the virtual space object image.

9. A non-transitory computer-readable recording medium storing a program that causes an information processing apparatus to perform a method according to claim 1.

10. An information processing method according to claim 1, wherein controlling (i) to allow passing the virtual space extending shape image through the exterior surface of the virtual space object image includes displaying the exterior surface of the virtual space object image as translucent.

11. An information processing method, comprising:

an image input step of inputting a real image of a real object captured by an image capturing device in real space;

a first position and orientation input step of inputting a position and orientation of the image capturing device;

a second position and orientation input step of inputting a position and orientation of the real object;

a model input step of inputting a three-dimensional model, wherein the three-dimensional model includes an interior and an exterior, and wherein the exterior has a shape that is the same as a shape of the real object, and exists in virtual space corresponding to the real space;

a first image generation step of generating a virtual image of the three-dimensional model which is arranged at a position and orientation corresponding to the position and orientation of the real object, based on the position and orientation of the image capturing device and the position and orientation of the real object;

a third position and orientation input step of inputting a position and orientation of a stylus which is manipulated by a user in the real space;

a second image generation step of generating a virtual image of a virtual indicator object by adding an extending shape to a tip of a shape of the stylus, based on the position and orientation of the image capturing device and the position and orientation of the stylus;

a third image generation step of generating a composite image of the real image and the virtual image of the three-dimensional model and the virtual image of the virtual indicator object;

a presentation step of presenting the composite image to the user; and a haptic force generation step of generating haptic force to the stylus when the extending shape comes in contact with the interior of the three-dimensional model to generate a haptic force to the stylus from the contact without first generating haptic force to the stylus when the extending shape passes through virtual material of the existing exterior of the three-dimensional model without interference from the virtual material of the existing exterior.

12. An information processing method according to claim 11, wherein the first image generation step generates a virtual image of the three-dimensional model which has translucence exterior.

13. A non-transitory computer-readable recording medium storing a program that causes an information processing apparatus to perform a method according to claim 11.

14. An information processing apparatus, comprising:

an image input unit configured to input a real image of a real object captured by an image capturing device in real space;

a first position and orientation input unit configured to input a position and orientation of the image capturing device;

a second position and orientation input unit configured to input a position and orientation of the real object;

a model input step of inputting a three-dimensional model, wherein the three-dimensional model includes an interior and an exterior, and wherein the exterior has a shape that is the same as a shape of the real object, and exists in virtual space corresponding to the real space;

a first image generation unit configured to generate a virtual image of the three-dimensional model which is arranged at a position and orientation corresponding to the position and orientation of the real object, based on the position and orientation of the image capturing device and the position and orientation of the real object;

a third position and orientation input unit configured to input a position and orientation of a stylus which is manipulated by a user in the real space;

a second image generation unit configured to generate a virtual image of a virtual indicator object by adding an extending shape to a tip of a shape of the stylus, based on the position and orientation of the image capturing device and the position and orientation of the stylus;

a third image generation unit configured to generate a composite image of the real image and the virtual image of the three-dimensional model and the virtual image of the virtual indicator object;

a presentation unit configured to present the composite image to the user; and a haptic force generation unit configured to generate haptic force to the stylus when the extending shape comes in contact with the interior of the three-dimensional model to generate a haptic force to the stylus from the contact without first generating haptic force to the stylus when the extending shape passes through virtual material of the existing exterior of the three-dimensional model without interference from the virtual material of the existing exterior.

* * * * *